US006355175B1

(12) United States Patent
Green et al.

(10) Patent No.: US 6,355,175 B1
(45) Date of Patent: *Mar. 12, 2002

(54) METHOD FOR SEPARATING AND ISOLATING PRECIOUS METALS FROM NON PRECIOUS METALS DISSOLVED IN SOLUTIONS

(75) Inventors: Dennis H. Green, Arvada; Jeff Mueller; John A. Lombardi, both of Boulder, all of CO (US)

(73) Assignee: HW Process Technologies, Inc.

( * ) Notice: Subject to any disclaimer, the term of this patent is extended or adjusted under 35 U.S.C. 154(b) by 0 days.

This patent is subject to a terminal disclaimer.

(21) Appl. No.: 09/445,200

(22) Filed: Mar. 22, 2000

Related U.S. Application Data

(63) Continuation-in-part of application No. 08/871,176, filed on Jun. 9, 1997, now Pat. No. 5,961,833
(60) Provisional application No. 60/064,280, filed on Oct. 30, 1997, and provisional application No. 60/071,370, filed on Jan. 15, 1998.

(51) Int. Cl.$^7$ ............................................. B01D 61/58
(52) U.S. Cl. ....................... 210/652; 210/639; 210/651; 423/29; 75/744
(58) Field of Search ............................... 210/638, 639, 210/651, 652; 75/743, 744; 423/23, 29

(56) References Cited

U.S. PATENT DOCUMENTS

| | | |
|---|---|---|
| 778,348 A | 12/1904 | Anderson |
| 996,179 A | 6/1911 | Wheelock |
| 3,816,587 A | 6/1974 | Gosser |
| 3,928,146 A | 12/1975 | Russell |
| 4,752,363 A | 6/1988 | Buckley et al. |
| 4,824,575 A | 4/1989 | Schlossel |
| 4,880,511 A | 11/1989 | Sugita |
| 4,944,882 A | 7/1990 | Ray et al. |
| 4,971,625 A | 11/1990 | Bahr |
| 4,981,594 A | 1/1991 | Jones |

(List continued on next page.)

OTHER PUBLICATIONS

Suttill, K.R.; "Ecuador: Potential Moving to Reality?"; *Engineering and Mining Journal*; 4/96; pp. 31–37.
Bernard, G.M.; "Andacollo Gold Production—Ahead of Schedule and Under Budget"; *Mining Engineering*; 8/96; pp. 42–47.
Van Zyl, D.J.A., et al., "Introduction to Evaluation, Design and Operation of Precious Metal Heap Leaching Projects"; *Society of Mining Engineers, Inc.*; (Chapter 8 by Omar A. Muhtadi and Chapter 9 by David A. Milligan, et al.); 1988; pp. 124–151.
Harris, L., et al., "Newmont's Yanacocha Project: The Joint Venture Three Years Later"; *Mining Engineering*; 2/26; pp. 41–47.
Arbiter, N., et al., "Gold—Advances in Precious Metal Recovery"; *Gordon & Breach Science Publishers*, New York; 1990; pp. 143–186.

(List continued on next page.)

*Primary Examiner*—Ana Fortuna
*Assistant Examiner*—Richard W. Ward
(74) *Attorney, Agent, or Firm*—Sheridan Ross P.C.

(57) ABSTRACT

A method for separating gold and/or silver from copper or other contaminant metals is provided in which a suitable filter membrane (64), particularly a nanofilter, is used to form a retentate (134) containing most of the multivalent metal cyanide complexes and a permeate (135) containing most of the precious metal cyanide complexes. The process is particularly applicable to the recovery of gold and/or silver from ores containing these metals and one or more contaminant metals. The precious metal can thereafter be recovered from the permeate (135) and the metal in the multivalent metal cyanide complex from the retentate (134).

19 Claims, 12 Drawing Sheets

U.S. PATENT DOCUMENTS

| | | | |
|---|---|---|---|
| 4,992,179 | A | 2/1991 | Brierley et al. |
| 5,028,336 | A | 7/1991 | Bartels et al. |
| 5,039,416 | A | 8/1991 | Loew et al. |
| 5,041,227 | A | 8/1991 | Van Eikeren et al. |
| 5,112,483 | A | 5/1992 | Cluff |
| 5,114,576 | A | 5/1992 | Ditzler et al. |
| 5,182,165 | A | 1/1993 | Clough et al. |
| 5,238,581 | A | 8/1993 | Frame et al. |
| 5,254,153 | A | 10/1993 | Mudder |
| 5,264,192 | A | 11/1993 | Shutt et al. |
| 5,266,203 | A | 11/1993 | Mukhopadhyay et al. |
| 5,310,486 | A | 5/1994 | Green et al. |
| 5,372,701 | A | 12/1994 | Gerdon et al. |
| 5,403,490 | A | 4/1995 | Desai |
| 5,411,575 | A | 5/1995 | Fleming et al. |
| 5,476,591 | A | 12/1995 | Green |
| 5,587,083 | A | 12/1996 | Twardowski |
| 5,766,478 | A | 6/1998 | Smith et al. |
| 6,156,186 | A | * 12/2000 | Mueller et al. |
| 6,162,361 | A | * 12/2000 | Adiga |

OTHER PUBLICATIONS

Brown, T.L., et al.; "Chemistry, The Central Science"; *Prentice Hall, New Jersey*, 4$^{th}$ Ed.; 1988; p. 815.

Information Sheet by Osmonics, Inc. of Minnetonka, MN; "The Filtration Spectrum"; 1993.

Lien, L.; "Nanofiltration: Trend of the Future?"; *Water Conditioning & Purification*; 9/92; pp. 24–27.

Application Bulletin: Desal–5 107 by *Desalination Systems, Inc. of Escondido, CA*; 4–91.

Product Summary Sheet "Ultrafiltration & Microfiltration Elements"; *Desalination Systems, Inc. of Escondido, CA*; 4/91.

Product Summary Sheet "Reverse Osmosis Elements"; *Desalination Systems, Inc. of Escondido, CA*; 4/91.

Clennell, J.E.; "The Cyanide Handbook"; *McGraw Hill*; 1915; pp. 102–132.

Thomas, R. (ed.); "E/MJ Operating Handbook of Mineral Processing"; *McGraw–Hill*; 1977; pp. 22–23.

Cheryan, M., et al., "Consider Nanofiltration for Membrane Separation"; *Chemical Engineering Progress*; 3/94; pp. 68–74.

* cited by examiner

DIRECT ELECTROWIN

INDIRECT ELECTROWIN: CuCN SOLID FEED

INDIRECT ELECTROWIN: CARBON ELUATE FEED

INDIRECT ELECTROWIN: CHELATE FEED

DIRECT EW: Cu(CN)₂ CELL

PROCESS FOR THE RECOVERY OF GOLD FROM CYANIDE LEACH SOLUTIONS

SCHEMATIC

TYPICAL MINING INDUSTRY CN WASTEWATER
TREATMENT FLOWSHEET

COPPER AND BASE METAL CONCENTRATION FROM THE "BARRENS" SCHEMATIC

COPPER AND BASE METAL CONCENTRATION FROM THE "BARRENS"
SCHEMATIC

METHOD FOR SEPARATING AND ISOLATING PRECIOUS METALS FROM NON PRECIOUS METALS DISSOLVED IN SOLUTIONS

CROSS REFERENCE TO RELATED APPLICATIONS

This is a continuation-in-part of U.S. patent application, Ser. No. 08/871,176 filed Jun. 9, 1997 now U.S. Pat. No. 5,961,833 issued Oct. 5, 1999; and claims the benefit of U.S. Provisional Applications, Ser. Nos. 60/064,280 filed Oct. 30, 1997, and 60/071,370 filed Jan. 15, 1998.

FIELD OF THE INVENTION

The present invention generally relates to the processing of metal-contaminated, precious metals-containing solutions, and more particularly to a method in which gold ore that also contains copper and other contaminant metals is treated to effectively separate gold from the copper and other contaminant metals.

BACKGROUND

To recover elemental gold (Au) from gold-containing ore, the ore is typically contacted with one or more aqueous cyanide-containing leach solutions (or lixiviant). The gold and other metals are dissolved in the solution, forming various metal cyanide complexes such as $Au(CN)_2^{-1}$ and $Cu(CN)_3^{-2}$.

A variety of different physical methods may be employed to contact the ore with the cyanide-containing leach solution. Two common methods are heap leaching and vat leaching. In heap leaching, coarsely comminuted ore is placed in a pile which is positioned on an impervious liner. The cyanide-containing leach solution is applied to the top of the ore pile and allowed to travel (e.g. percolate) through the heap. A pregnant leach solution containing one or more monovalent gold-cyanide complexes and other dissolved metal cyanide complexes collects on the liner at the bottom of the pile. In vat leaching, finely comminuted ore is placed in a large container or "vat" along with the cyanide leach solution to form a slurry. The solution extracts gold and other metals from the ore forming the pregnant leach solution.

A number of different procedures may be employed to recover the dissolved gold from the cyanide solution. Two common gold recovery methods are the Merrill-Crowe process and the activated carbon process.

In the Merrill-Crowe Process, the pregnant leach solution undergoes zinc cementation/precipitation reaction. Specifically, the pregnant leach solution containing the gold-cyanide complex is combined with elemental zinc (Zn) to generate solid elemental gold (Au) which resides within a gold-zinc solid sludge reaction product. The product is removed by filtration from the residual liquid fraction (which consists primarily of free cyanide ions [$(CN)^-$] and a dissolved $Zn(CN)_4^{-2}{}_{(aq)}$ complex). The product is processed to isolate and recover the elemental gold by combining the product, after water washing, with sulfuric acid ($H_2SO_4$) in the presence of air to dissolve excess (unreacted) elemental zinc and other metals including copper and cadmium. The remaining solid material is smelted in the presence of a flux to produce a highly pure gold dore.

In the activated carbon process, the pregnant leach solution is placed in contact with activated carbon and the dissolved gold-cyanide complexes in solution are adsorbed onto the surface of the activated carbon. After adsorption, the gold-containing carbon product is filtered to remove residual "barren" liquid, followed by "desorption" or removal of the gold-cyanide complex from the "loaded" activated carbon (e.g. the gold-containing carbon product) by passing an eluant solution through the carbon. It is theorized that cyanide ions [$(CN)^-$] in the eluant solution effectively replace/exchange the adsorbed aurocyanide ions (gold-cyanide complex) which are released into the eluant solution. The resulting gold-containing eluant product (which contains the desired gold species [aurocyanide ions/gold cyanide-complex]) is then processed by any suitable technique to recover elemental gold.

Regardless of which methods are ultimately used to obtain elemental gold from gold-cyanide complexes, numerous technical and economic problems can occur when gold ore is processed which contains substantial amounts of elemental copper and other contaminant metals. Such metals can have a stronger affinity for cyanide ions than gold and form metal cyanide complexes. For example, the copper-cyanide complex ($Cu(CN)_3^{-2}$) which is generated as a result of this reaction is incapable of extracting gold from gold ore to yield the desired gold-cyanide complex and consumes three moles of $(CN)^-$. As more copper leaches into the recirculating leaching solution (which occurs during reuse of this material and repeated passage thereof through incoming quantities of gold ore), increasingly large amounts of cyanide are lost to this complex. Such contaminant metals can therefore cause excessive cyanide consumption, thereby increasing process operating and capital expenses and substantial reductions in the operating efficiency of the entire gold production facility.

In addition to excessive cyanide consumption, copper and other metals within the gold ore can also result in an increasingly impure elemental gold product. Additional and more costly refining procedures must therefore be employed to solve this problem. By way of example, if the Merrill-Crowe process is used, extraneous copper materials in the solution can dramatically reduce the precipitation efficiency of the system by causing zinc passivation, with the term "passivation" involving a process in which the zinc is rendered non-reactive to the gold-cyanide complex which prevents the gold precipitation process from taking place. Additional zinc is often required which again increases overall production costs. Excessive contaminant metal contamination of the leaching solution can also reduce the operating efficiency of the smelting process associated with this embodiment by causing prolonged smelting times. For example in systems which employ the activated carbon process, copper materials (e.g. copper-cyanide complexes) will substantially inhibit the functional capabilities of the activated carbon, thereby "fouling" this material and causing increased carbon consumption. Power consumption is likewise increased in subsequent electrowinning stages if many contaminant metals are not removed from the system.

SUMMARY OF THE INVENTION

It is an object of the present invention to provide a method for separating gold and/or silver from copper and other contaminant metals in a gold and/or silver processing system which enables the removal of copper and/or other contaminant metals from the system.

It is another object of the invention to provide a method for separating gold and/or silver from copper and other contaminant metals in a gold and/or silver processing system which enables the purity levels of elemental gold and/or silver to be relatively high.

It is a further object of the invention to provide a method for separating gold and/or silver from copper and other contaminant metals in a gold and/or silver processing system in which the removal of copper and other contaminant metals is accomplished with relatively low consumption of cyanide and other reagents so that the overall efficiency of the system is improved.

The claimed process overcomes the problems outlined above in a very effective manner which will become readily apparent from the detailed information presented below. While specific processing systems and gold and/or silver recovery technologies will be discussed in connection with the claimed procedure, the present invention shall not be limited to any particular cyanide-based gold and/or silver extraction method or to leaching solutions generally. Instead, the invention is prospectively applicable to any production system which places gold- and/or silver-containing materials in physical contact with solutions containing free cyanide ions [$(CN)^-$] so that a gold- and/or silver cyanide complex as defined above is generated as well as any other application in which gold- and/or silver-containing solutions contaminated by other metals are treated to recover the gold- and/or silver. For example, the processes of the present invention are applicable to electroplating solutions.

In one embodiment of the present invention, a process for recovering a dissolved monovalent precious metal cyanide complex (e.g., $Au(CN)_2^{-1}$) from a cyanide solution containing the dissolved monovalent precious metal cyanide complex and one or more dissolved multivalent metal cyanide complexes (e.g., $Cu(CN)_3^{-2}$) is provided. A monovalent precious metal cyanide complex is a complex formed by gold or silver with two or more cyanide ions and therefore has an overall charge having an absolute value of one. A multivalent metal cyanide complex is a complex formed by a metal other than gold or silver with three or more cyanide ions and has an overall charge having an absolute value of two or more. The process includes the steps of (a) passing the cyanide solution through a filter to form a retentate containing a portion of the dissolved monovalent precious metal cyanide complex and most of the one or more dissolved multivalent metal cyanide complexes and a permeate containing most of the dissolved monovalent precious metal cyanide complex and (b) thereafter recovering the precious metal from the permeate to form a precious metal product. The retentate does not pass through the nanofiltration membrane while the permeate passes through the membrane. The permeate typically contains more than about 50% of the dissolved monovalent precious metal cyanide complex but less than about 50% of the dissolved multivalent metal cyanide complex. In contrast, the retentate typically contains more than about 50% of the dissolved multivalent metal cyanide complex but less than about 50% of the monovalent precious metal cyanide complex. The claimed method thus effectively removes undesired multivalent metal cyanide complexes (e.g. metal cyanide complexes in which the metal is copper, zinc, cobalt, iron, calcium, magnesium, nickel, lead, cadmium, mercury, platinum, and palladium) at the early stages of production in a rapid and efficient manner.

The cyanide solution can be formed by any number of processes. Commonly, the solution is formed by contacting a precious metal-containing material with an aqueous cyanide solution (e.g., a lixiviant) to extract the metals content of the material into the solution. The cyanide-containing solution shall be defined to encompass a solution, preferably aqueous, comprising free cyanide ions [$(CN)^-$] therein in combination with a selected counter-ion (e.g. $Na^+$, $K^+$, $Ca^{+2}$, and the like). Representative cyanide solutions suitable for this purpose will generally contain a dissolved cyanide compound (salt) therein, with representative examples of this material including but not limited to sodium cyanide (NaCN), potassium cyanide (KCN), calcium cyanide (Ca$(CN)_2$), ammonium cyanide ($NH_4CN$), organic alpha-hydroxy cyanides (e.g. lactonitrile), and mixtures thereof. The liquid product will typically include about $1\times10^{-3}$–$1\times10^{-4}$% by weight gold-cyanide complex and about 0.05–1.0% by weight multivalent metal cyanide complexes though these values are subject to change in accordance with the particular type, grade, and character of material being processed.

The filter can be any suitable filtration device that is capable of removing selectively the desired multivalent metal cyanide complexes from the solution. Preferably, the filter has a pore size ranging from about 5 to about 100 angstroms and more preferably from about 10 to 20 angstroms. Preferred filters include electrically charged filters which generally repel dissolved multivalent metal cyanide complexes while passing dissolved monovalent precious metal cyanide complexes, with a "nanofiltration-type membrane" being more preferred.

As will be appreciated, the conditions under which the separation is effectuated are important to the efficiency of the separation. In a preferred embodiment, the solution is delivered to the filter at a preferred and optimum flow rate of about 100–10,000 GPM (gallons per minute), though this value may be varied as needed in accordance with preliminary pilot studies involving the particular system under consideration and its overall capacity. Passage of the permeate through the filtration membrane typically occurs at an optimum and non-limiting membrane flux rate of about 2–20 GFD (gallons per ft$^2$ per day]).

The precious metal may be recovered from the permeate by any number of techniques. The terms "recovery" and "recovering" in connection with the recovery of elemental gold and/or silver and/or other metals may comprise a number of procedures and shall not be restricted to any particular precious or nonprecious metal isolation techniques. For example, the recovery method can be by cementation (e.g., the Merrill-Crowe process), amalgamation (e.g., using an amalgamating agent such as mercury), precipitation (e.g., as a sulfide), electrolysis (e.g., electrowinning), ion exchange (e.g., solvent extraction), and/or adsorption or absorption (e.g., the activated carbon process) or any combination thereof.

After recovery of the precious metal, the permeate can be recycled to extract further precious and nonprecious metals from additional material. For example, the permeate can be passed through a second filter having a smaller pore size than the first filter to form a second retentate including at least most of the dissolved monovalent metal cyanide complexes remaining in the permeate after the recovery step and a second permeate including at least most of any water in the permeate.

The retentate can be subjected to further recovery steps to recover one or more of the metals in the dissolved multivalent metal cyanide complexes and/or the cyanide in the complexes. By way of example, the retentate can be contacted with a chelating agent and the cyanide thereafter removed from the retentate to form a cyanide depleted retentate; the metal recovered from the cyanide depleted retentate to form a barren retentate; and the barren retentate passed through a filter to form a second retentate including at least most of the chelating agent in the barren retentate and a second permeate. The retentate can be acidified to convert cyanide into HCN; the HCN removed from the acidified retentate as a gas to form a cyanide depleted retentate; the depleted retentate contacted with a base to form an electrolytic solution for an electrowinning cell; and the metal recovered in the electrowinning cell. The metal depleted retentate can be passed through a second filter to form a second retentate for recycle to the electrowinning step and a second permeate. The retentate can be contacted with an acid to precipitate the metal from the retentate as a metal cyanide compound; the metal cyanide compound dissolved in an aqueous solution to form an electrolyte solution; and the electrolyte solution subjected to electrowinning to recover the metal. Finally, the metal can be adsorbed from the retentate onto a substrate (e.g., activated carbon); the metal desorbed in an eluate solution; the eluate passed through a second filter to form a second retentate including at least most of the copper and a second permeate; and the second retentate subjected to electrowinning. Alternatively, instead of processing the metal-cyanide complex as outlined above, this material (e.g. the retentate) may be discarded in a suitable manner.

In a further embodiment of the present invention, a process for recovering the dissolved precious metal cyanide complex is provided in which the precious metal is first recovered from the solution to form a precious metal depleted solution and the precious metal depleted solution then passed through a filter to form a retentate containing at least most of the dissolved multivalent metal cyanide complex and a permeate, generally containing most of any precious metal cyanide complex remaining in the precious metal depleted solution. The recovering step can include adsorbing the precious metal and the metal in the multivalent metal cyanide complex from the solution onto a substrate; desorbing the precious metal and the metal to form an eluate solution including the dissolved precious metal and dissolved metal; and electrowinning the precious metal from the eluate solution.

The above-described separation method can offer a number of benefits. It can more effectively utilize cyanide-containing species (e.g. free cyanide ions $[(CN)^-]$) by removing the multivalent metal cyanide complexes from the system and thereby reduce production costs relative to existing processes. The elimination of multivalent metal-containing species (e.g. the copper-cyanide complex) from the system can also prevent the interference of such metals with subsequent processing steps including the electrowinning and smelting stages. As a result, "impure" precious metal ore (which was previously considered economically undesirable) can be processed in a cost-effective manner. It is readily applicable to a wide variety of cyanide-based treatment methods. It is highly versatile and satisfies a long-felt need in the gold processing industry. It can decrease, relative to existing processes, consumption of reagents other than cyanide including activated carbon and zinc (depending on the particular recovery system under consideration). It can reduce electricity consumption in electrowinning relative to other processes. It can conserve resources and reduce waste generation which collectively provide important environmental benefits. It can reduce, relative to other processes, the smelting time that is needed to yield an elemental gold product. It can recover nonprecious metals from the precious metal ore which can be sold at considerable economic benefit. Finally, it can produce a highly pure precious metal product dore.

DETAILED DESCRIPTION

Figure 1:
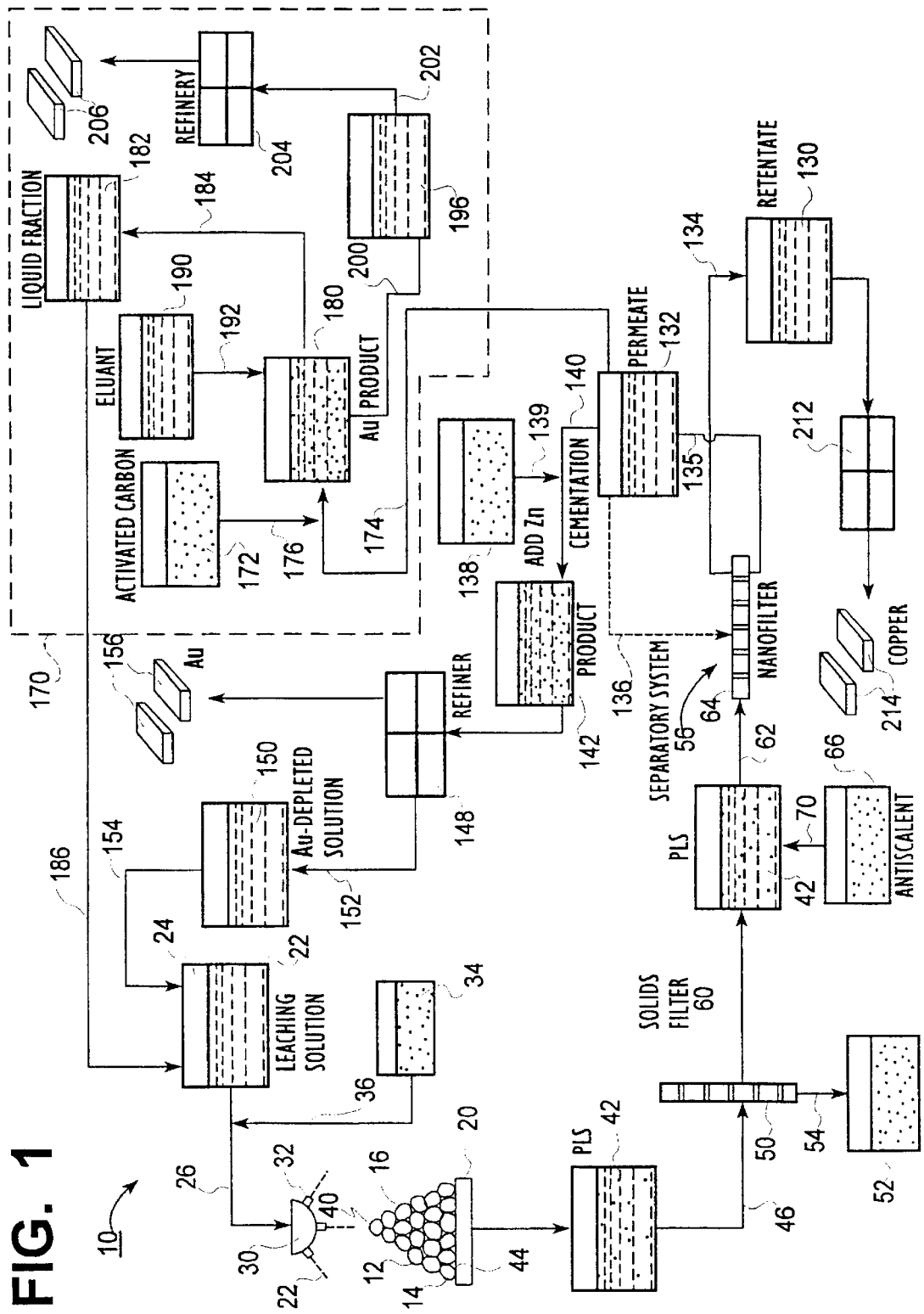
FIG. 1 is a schematic flow diagram illustrating a first embodiment of the present invention.

Referring to FIG. 1, a first embodiment of an ore processing system 10 is depicted. In the system, a supply of precious metal-containing ore 12 is initially provided. The present invention shall not be limited to any particular parameters, materials, components, ore grades, and equipment used in connection with the leaching process and system 10. Any cyanide-based leaching procedure can be used provided that an aqueous liquid product is produced which contains a precious metal cyanide complex therein. However, this invention is primarily directed to the use of precious metal ore 12 which not only contains elemental precious metals (e.g., gold (Au and/or silver (Ag)) but also includes substantial amounts of elemental nonprecious metals, e.g., copper (Cu). In a representative and non-limiting embodiment, most precious metal ore 12 of concern in the claimed invention will contain about 0.0001–0.0005% by weight elemental gold, and/or about 0.005 to about 0.025% by weight elemental silver, and about 0.1–2% by weight elemental nonprecious metal. Although the precious metal can be either gold or silver (with gold being more preferred) and the nonprecious metal can be any metal that forms a multivalent cyanide complex in solution (with copper being more preferred), the process shall, for the sake of simplicity, only be described with specific reference to copper/gold ore.

As shown in the embodiment of FIG. 1, the ore 12 is provided in the form of rock materials 14 which are configured in a heap or pile 16. The term "rock materials" as used herein includes without limitation discrete portions or "chunks" of rock having an average diameter of about 1–4 inches, crushed/powered rock (e.g. with an average (non-limiting) particle size of about 200 U.S. standard mesh or less), or large sections/deposits of ore, all of which are normally treated at a mine site. This invention and the cyanide treatment processes of concern shall not be restricted to any particular physical characteristics in connection with the gold ore 12, with the discussion of rock materials 14 (and the dimensional parameters listed above) being provided for example purposes. Size reduction of the ore 12 to a desired level (e.g. to create the rock materials 14 having the desired size characteristics as previously described) may be undertaken in a conventional manner using standard equipment including jaw crusher units, attrition mills, and/or roll crusher systems which are known in the art for this purpose. The pile 16 of gold ore 12 is normally of significant size. For example, representative ore piles 16 may typically be about 30–50 ft. tall and will occupy about $1 \times 10^7$–$3 \times 10^7$ cubic feet of space, although these values can be varied as needed in accordance with the mine site/processing facility under consideration. In a preferred embodiment, each pile 16 of ore 12 (e.g. rock materials 14) is placed on a pad 20 manufactured of rubber or other composition which is substantially inert relative to the cyanide salts materials that are normally encountered in the leaching process.

Thereafter, a leaching solution containing cyanide therein (e.g. a "cyanide-containing leaching solution" 22) which is initially retained within a containment vessel 24 made of stainless steel or other inert material is applied to the pile 16 of ore 12 via tubular conduit 26. The tubular conduit 26 is operatively connected to a spraying assembly 30. The spraying assembly 30 may be of any conventional design which optimally has multiple nozzles 32 associated therewith (FIG. 1). While the cyanide concentration of the leaching solution 22 may be varied in accordance with a wide variety of parameters including the type and character of the gold ore 12 being treated, a representative and preferred leaching solution 22 will contain about 0.1–2% by weight dissolved cyanide-containing compound. It should also be noted that the conduit 26 (as well as any of the other conduits in the system 10 as outlined below) may include one or more inline pumps therein (not shown) if needed in accordance with preliminary pilot studies on the specific processing system under consideration. The particular pump which may be employed for this purpose can be of any conventional type suitable for transporting the materials under consideration including but not limited to centrifugal, positive-displacement, and/or other pumps known in the art.

In most cases, it is desirable and important from a safety and efficiency standpoint to ensure that the pH of the leaching solution 22 be maintained at a level of about 9–11. At pH levels below 9, noxious gases are generated which endanger personnel. At pH levels above 11, recovery of the desired gold-cyanide complex (discussed below) can be hindered. To accomplish this goal as determined by preliminary and routine pilot studies, it may be necessary to periodically test and adjust the pH of the leaching solution 22 prior to and/or during use by adding a selected alkali composition to the solution 22. Preferred compounds suitable for this purpose include calcium oxide (which is also known as "lime" or CaO), as well as NaCO, and/or NaOH. The alkali composition is schematically shown in FIG. 1 at reference number 34, and is introduced into the system 10 via tubular conduit 36. The amount of alkali material to be used (if necessary) will vary depending on the relative pH of the leaching solution 22, the chemical content of the ore 12 being processed, and other parameters including the specific type of processing system under consideration. The quantity of alkali material (and the general need for such an additive) may therefore be determined in accordance with routine testing procedures involving standard pH analyzing equipment which will provide a continuous monitoring of the leaching solution 22 before and during use thereof. In a representative and non-limiting embodiment, about 0.1–1 g of calcium oxide (CaO) will typically be used per liter of the leaching solution 22 which is formulated as discussed above. Nonetheless, it is important to emphasize that the use of alkali materials (as well as any other additives) in the leaching solution 22 is optional, with the need for such materials again being determined in accordance with preliminary studies on the gold ore 12 being treated and other factors. The same situation exists in connection with the overall amount of leaching solution 22 to be employed in connection with the heap or pile 16 of ore 12. However, in a representative and non-limiting embodiment (which is subject to variation if necessary as determined by preliminary analysis), about 200–500 gallons of the leaching solution 22 having the characteristics listed above will typically be used per ton of ore 12 (in rock or powder form).

The leaching solution 22 is introduced into the pile 16 of rock materials 14 (e.g. gold ore 12) at the top 40 thereof so that the leaching solution 22 is placed in direct physical contact with the ore 12. Thereafter, the leaching solution 22 is allowed to pass downwardly (e.g. percolate) through the pile 16, extracting gold from the rock materials 14 (ore 12) as it passes over and through the ore 12. This process is facilitated by the fairly porous nature of the rock materials 14/ore 12 as discussed above. The resulting liquid product (shown in FIG. 1 at reference number 42) is collected as it exits the pile 16 at the bottom 44 thereof.

At this point, the liquid product 42 will contain unreacted cyanide materials therein (e.g. cyanide ions [(CN)$^-$]), along with (1) a gold-cyanide complex; and (2) a copper-cyanide complex. The term "gold-cyanide complex" shall be defined generally to encompass a monovalent chemical complex containing one or more gold ions therein stoichiometrically combined with one or more cyanide ions ((CN)$^-$]. This complex will typically consist of Au(CN)$_2^{-1}$ (also known as an "aurocyanide ion") which is associated with one or more counter-ions including, for example, Na$^+$ when NACN is employed in producing the leaching solution 22, K$^+$ when KCN is used, and Ca$^{+2}$ when Ca(CN)$_2$ is involved. The Au(CN)$_2^{-1}$ complex has a high level of stability with a K$_f$ of about $2 \times 10^{38}$. A typical reaction sequence in which a gold-cyanide complex of the type described above is produced using a selected cyanide-containing leaching solution 22 is as follows:

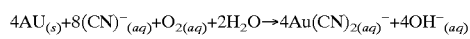

The term "copper-cyanide complex" as used herein shall be defined to involve a multivalent chemical complex containing one or more copper ions stoichiometrically combined with one or more cyanide ions [(CN)$^-$]. This complex will typically consist of Cu(CN)$_3^{-2}$ (also known as a "cuprocyanide ion") which is associated with one or more counter-ions including, for example, Na$^+$ when NaCN is employed in producing the leaching solution 22, K$^+$ when KCN is used, and Ca$^{+2}$ when Ca(CN)$_2$ is involved. The typical reaction that forms the copper cyanide complex is as follows:

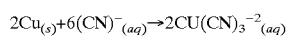

Much of the copper-cyanide complex (Cu(CN)$_3^{-2}$) which is generated as a result of this reaction passes unaffected through the gold extraction and isolation processes outlined above, and ultimately resides in the "barren" cyanide-containing solution materials which remain after the gold-cyanide complex is removed. This barren solution is normally reused/recycled in treating incoming amounts of additional gold ore 12. Regarding the amount of copper-cyanide complex (Cu(CN)$_3^{-2}$) in the liquid product 42 at this point, it will typically contain about $1 \times 10^{-3}$–$1 \times 10^{-4}$% by weight gold-cyanide complex and about 0.05–1.0% by weight copper-cyanide complex, though the claimed process shall not be restricted to a liquid product 42 having these parameters which will vary in accordance with the type of gold ore 12 being processed and other extrinsic factors.

The liquid product 42 may thereafter pass via tubular conduit 46 into an optional solids filter 50 which is used to remove extraneous particulate matter (e.g. residual ore materials or "gangue") from the liquid product 42. In a preferred embodiment, the solids filter 50 will consist of a backwashable sand bed filter known in the art or another suitable system. Solid materials trapped by the solids filter 50 (schematically designated at reference number 52 in FIG. 1) are ultimately routed out of the filter 50 and system 10 for disposal through tubular conduit 54. The use of a solids filter 50 for this purpose is again optional as determined by preliminary pilot studies on the particular liquid product 42 under consideration and its overall solids content.

After passage of the liquid product 42 through the solids filter 50 (if used), the liquid product 42 is ready for further processing. As noted, the liquid product 42 may likewise contain other materials therein (e.g. dissolved metal containing-species derived from a number of different metals including silver (Ag), lead (Pb), and the like). The type and amount of these additional materials in the liquid product 42 will depend on the particular ore 12 being treated. The liquid product 42 may either be temporarily stored in one or more large outdoor pond-type structures (not shown) or immediately subjected to further processing, depending on the overall capacity of the system 10 as determined by preliminary testing.

With continued reference to FIG. 1, the liquid product 42 is routed directly from the pile 16, the solids filter 50 (if used), or a temporary holding pond (if employed) into the separatory system 56 of the present invention via tubular conduits 60, 62. The separatory system 56 generally consists of at least one and preferably multiple nanofiltration membrane units. A single, representative nanofiltration membrane unit 64 is illustrated in schematic format in FIG. 1. Further information regarding nanofiltration is also presented in U.S. Pat. Nos. 5,476,591 and 5,310,486 which are each incorporated herein by reference. It should be noted at this point that the present invention shall not be restricted to any specific arrangement or number of nanofiltration membrane units or nanofiltration membranes themselves (but can include other types of filters). If multiple membrane units are employed, they may be configured in series, in parallel, or in a combination of both as discussed in greater detail below (along with specific examples). The ultimate arrangement of nanofiltration membrane units in the separatory system 56 will depend on a variety of factors including the chemical character and content of the liquid product 42, the overall size/capacity of the system 10, the incoming flow rate of the liquid product 42, the size of the nanofiltration membrane units under consideration, and other factors as determined by preliminary testing. For example, in applications involving a liquid product 42 having a relatively high incoming flow rate (e.g. exceeding about 1000 GPM or more), the liquid product 42 is preferably divided into a plurality of portions which are passed through a series of nanofiltration membrane units operated in parallel, followed by passage of the liquid product 42 through a series of nanofiltration membrane units operated in series. This technique enables relatively large initial feed streams to be handled and treated in a more rapid and efficient manner without overloading the system 10. In addition, the ultimate number of nanofiltration membrane units in the separatory system 56 will likewise vary (ranging from one to multiple units), again depending on the amount of liquid product 42 to be treated, the concentration of the copper-cyanide complex and gold-cyanide complex in the liquid product 42, the initial flow rate, and other factors. As previously noted, specific examples of multiple nanofiltration membrane systems which are suitable for use herein will be provided below.

The claimed invention shall likewise not be limited to any incoming flow rate in connection with the liquid product 42 as it enters the separatory system 56. Regardless of whether a single or multiple nanofiltration unit system is employed, it is preferred that the liquid product 42 be delivered to the selected separatory system 56 (e.g. nanofiltration membrane unit(s)) at a representative, non-limiting flow rate of about 100–10,000 GPM (gallons per minute), with this parameter being varied as needed in accordance with routine preliminary testing procedures.

However, prior to filtration of the liquid product 42 using the nanofiltration membrane separatory system 56 as discussed in substantial detail below, another important factor merits further consideration. Specifically, at least one antiscalant composition may optionally be added to the liquid product 42 prior to nanofiltration in the separatory system 56. The use of an antiscalant composition is preferred when the liquid product 42 contains substantial amounts of dissolved calcium or other sparingly soluble salts therein. For example, the addition of an antiscalant composition is desirable when the liquid product 42 contains more than about 0.1 g/l of calcium ions therein. Dissolved calcium within the liquid product 42 may come from the ore 12 being treated and/or can result from the use of "hard" water to initially prepare the aqueous leaching solution. With reference to FIG. 1, a supply of a selected antiscalant composition (discussed further below) is shown at reference number 66 which is delivered to the liquid product 42 prior to treatment in the nanofiltration membrane separatory system 56 via tubular conduit 70.

The addition of at least one antiscalant composition 66 (FIG. 1) will prevent the formation of calcium precipitates or other sparingly soluble salts (e.g. $CaSO_4$, and/or $CACO_3$) during nanofiltration. Such precipitates can clog (e.g. foul) the selected nanofiltration membrane(s) in the separatory system 56, thereby reducing the operational efficiency of the entire processing system. The amount of antiscalant composition 66 to be employed will depend on numerous factors, including but not limited to the chemical character of the liquid product 42, the pH of the liquid product 42, the amount of dissolved calcium within the liquid product 42, and other extrinsic factors. In this regard, preliminary pilot tests on the liquid product 42 of interest may be used to determine whether antiscalant compositions are needed and how much antiscalant compositions should be used. However, in a representative and non-limiting embodiment involving a situation in which the use of a selected antiscalant composition 66 is warranted, about $1 \times 10^{-2}$–$1 \times 10^{-4}$ grams of the selected antiscalant composition 66 will typically be used per liter of the liquid product 42. Again, this value may be varied as needed. It should also be noted that the antiscalant composition 66 may simply be added to the liquid product 42 in the foregoing amount as a routine practice. Ultrafiltration membranes will typically prevent the passage therethrough of materials having a size (average diameter) exceeding about 50–200 angstroms regardless of valence. Of even greater importance in this case is the substantial difference in filtration capability between nanofiltration membranes and reverse osmosis membranes. Reverse osmosis membranes will normally prevent the passage therethrough of compositions having a size (average diameter) greater than about 2–5 angstroms regardless of valence.

There is a significant and substantial difference between nanofiltration systems and other membrane technologies including reverse osmosis. Regarding separation characteristics, nanofiltration is located between reverse osmosis and ultrafiltration, and fills the "gap" that exists between these two technologies. The significant dissimilarities in capacity and operational ability which exist between nanofiltration membranes and reverse osmosis membranes include many items. For example, according to the above-listed article, nanofiltration membranes effectively operate at lower pressures of about 1.4 MPa/200 psi compared with reverse osmosis membranes which normally have operating pressure requirements exceeding about 4 MPa. Most commercially available nanofiltration membranes also have a very high membrane flux which enables them to operate at relatively low fluid pressures (e.g. 75–200 psi). The term "membrane flux" as used herein is defined as the flow rate/capacity of materials through the selected membrane as a function of the membrane area in, for example, gallons per $ft^2$ per day ("GFD"). There are also differences in the types of materials which can pass through these membranes.

The use of one or more nanofiltration membranes in the separatory system 56 of the present invention provides numerous advantages compared with other membrane types including reverse osmosis. These advantages include but are not limited to lower required operating pressures, higher flux levels, and reduced fouling tendencies. Likewise, it has been discovered in accordance with the present invention that nanofiltration membranes are particularly well-suited (compared with other membrane types) for effectively differentiating between the copper-cyanide complex and the gold-cyanide complex in the liquid product 42 generated within the system 10 so that these materials can be separated from each other. The high degree of separation efficiency achieved by nanofiltration membranes involving copper and gold-containing species results from the ability of these membranes to differentiate between metal ions based on charge, with the scientific basis for this ability not being currently understood. For this reason, nanofiltration membranes are preferred for use in the separatory system 56 of the invention and represent a unique development in the art of the gold processing, especially in the treatment of "impure" copper-containing gold ore 12.

A number of different commercially available nanofiltration membrane units may be employed in the separatory system 56 (e.g. as the nanofiltration membrane unit 64 shown in FIG. 1). A representative nanofiltration membrane cartridge unit suitable for use herein is produced by Desalination Systems, Inc. of Escondido, Calif. under the name "Desal-5". This membrane unit is typically configured in the form of an elongate cartridge which is illustrated schematically in FIG. 2 at reference number 100. Each cartridge 100 is typically about 40 inches long and preferably between about 4–8 inches in diameter. The cartridge 100 includes a housing 102 having a first end 104 and a second end 106. The first end 104 and the second end 106 are both open so that fluids may pass through the housing 102. In the center of the cartridge 100 is an elongate conduit 110 having numerous openings 112 therethrough. Surrounding the conduit 110 are multiple, spirally-wound layers 114 of filter membrane material which is proprietary in structure and chemical composition. Also associated with the layers 114 of filter membrane material are layers 116 of a porous spacer material (e.g. a proprietary plastic/polymer mesh) and layers 120 of a porous membrane backing material (e.g. also manufactured of a proprietary porous plastic composition) to which the layers 114 of filter membrane material are affixed. In use, the fluid to be treated (e.g. the liquid product 42) enters the first end 104 of the cartridge 100 in the direction of arrow "X". The selected fluid is not allowed to enter the elongate conduit 110 which is designed to receive filtered permeate as described below. As a result, the incoming fluid (liquid product 42) passes between and through the layers 114 of filter membrane material. A retentate is formed between the layers 114 of filter membrane material which consists of materials that cannot pass through the layers 114 (e.g. the copper-cyanide complex in the liquid product 42 as discussed further below). In contrast, liquids and other materials associated therewith (e.g. the gold-cyanide complex of the present invention) which actually pass through the layers 114 of membrane material, layers 116 of spacer material, and layers 120 of backing material are collectively designated as the permeate. The permeate ultimately enters the conduit 110 via the openings 112 therethrough. It should be noted that the permeate flows inwardly toward the conduit 110 in a direction "Y" which is perpendicular to the direction of arrow "X". As a result, the permeate is allowed to leave the conduit 110 at the second end 106 of the cartridge 100 in the direction of arrow "P". The retentate flows along and between the layers 114 of filter membrane material and ultimately leaves the cartridge 100 at the second end 106 thereof in the direction of arrow "R". The flow of retentate in this manner (which is conventionally characterized as "cross-flow" filtration) is facilitated by continuous fluid pressure exerted on the system by incoming fluid materials (e.g. the liquid product 42).

Figure 2:
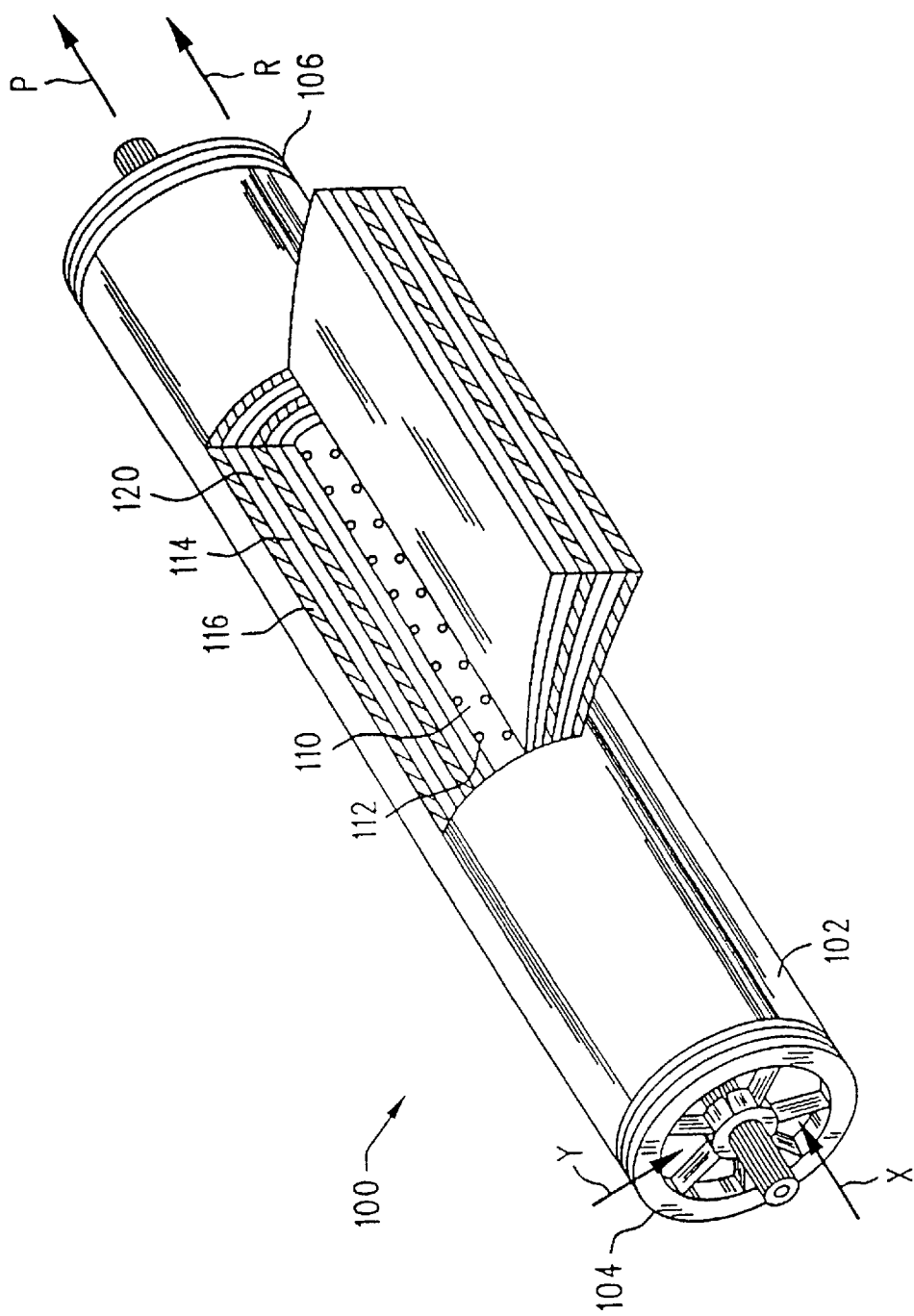
FIG. 2 is a schematic, partially-exploded view of a representative nanofiltration membrane cartridge unit which is suitable for use in the various embodiments of the invention.

As stated above, the cartridge 100 illustrated in FIG. 2 is available from Desalination Systems, Inc. of Escondido, Calif. under the name "Desal-5". However, other commercially-available nanofiltration systems/cartridge units may be used in connection with the present invention including but not limited to those produced by Osmonics, Inc. of Minnetonka, Minn. (USA) under the product designation "B-type TLC"; Hydranautics, Inc. of Oceanside, Calif. (USA) [model 4040-TFV-74501; and Film Tech, Inc. of Minneapolis, Minn. (USA) [model NF-45]. Accordingly, the claimed invention shall not be restricted to any particular type or arrangement of nanofiltration units. Furthermore, as previously noted, the number of cartridges 100 which function as the nanofiltration membrane unit(s) 64 in the separatory system 56 may be selectively varied, depending on the type and amount of incoming fluid (e.g. liquid product 42) to be treated. For example, if 10,000 gallons of the liquid product 42 having the composition values/ranges listed above are to be treated at an incoming flow rate of about 40 GPM, optimum results will be achieved if 18 "Desal-5" cartridges 100 are used in series, with each cartridge 100 being about 40 inches long and about 8.0 inches in diameter. Likewise, in cases involving a relatively high incoming flow rate (e.g. exceeding about 1000 GPM or more), the liquid product 42 is preferably divided into a plurality of portions which are passed through a series of nanofiltration membrane units operated in parallel, followed by passage of the liquid product 42 through a series of nanofiltration membrane units operated in series. This technique enables relatively large initial feed streams to be handled and treated in a more rapid and efficient manner without overloading the system 10. While a number of different nanofiltration cartridge unit arrangements may be employed for this purpose (with the present invention not being restricted to any specific arrangement), a representative system would involve first dividing the incoming liquid product 42 into two equal fractions. Each fraction would thereafter be treated in a separate "branch" or stage of the nanofiltration separatory system 56. In a preferred embodiment, each stage would include two cartridges 100 (e.g. of the type discussed above including "Desal-5" cartridges) in parallel, followed by two cartridges 100 in series. The retentates and permeates from both "stages" would then be rejoined at the end of the separatory process for further treatment, etc. However, this particular system represents a single, non-limiting embodiment with a number of other nanofiltration systems having different arrangements of cartridge units also being suitable for use herein.

Having presented a specific discussion of nanofiltration membrane technology and its distinctive character relative to other filtration membrane types including reverse osmosis membranes and ultrafiltration membranes, the unique abilities of nanofiltration technology in connection with the claimed process will now be addressed. Specifically, upon delivery of the liquid product 42 to the nanofiltration membrane separatory system 56 (e.g. the nanofiltration membrane unit 64), a retentate 130 is generated which does not pass through the nanofiltration membrane(s) associated with the separatory system 56 (membrane unit 64) and a permeate 132 is produced which does, in fact, flow through the nanofiltration membrane(s) associated with the separatory system 56. In a representative and non-limiting embodiment involving the preferred flow rates indicated above, the permeate 132 will optimally pass through the nanofiltration membrane(s) of the separatory system 56 (e.g. which uses a single nanofiltration unit or multiple units) at a representative membrane flux rate of about 2–20 GFD.

In addition, it is desired that the system 10 be capable of processing at least about 100–10,000 gallons of the liquid product 42 per minute which can be accomplished in accordance with the numerical parameters listed herein.

The retentate 130 comprises at least most of the copper-cyanide complex and other multivalent nonprecious metal cyanide complexes and some of the gold-cyanide complex and other monovalent precious metal cyanide complexes, while the permeate 132 contains at least most of the desired gold-cyanide complex, and little, if any, of the copper-cyanide complex and other multivalent nonprecious metal cyanide complexes, with both of these materials being effectively separated from each other using the nanofiltration membrane separatory system 56 (e.g. the nanofiltration membrane unit 64 shown in FIG. 1.) The retentate preferably comprises at least about 75%, more preferably at least about 90%, and even more preferably at least about 98% of the multivalent metal cyanide complexes in the pregnant leach solution. Preferably, the permeate is substantially free of such complexes and more preferably comprises no more than about 2% of the multivalent, metal-cyanide complexes in the pregnant leach solution. Preferably, the retentate comprises at least about 5 and more preferably at least about 50 g/l and the permeate no more than about 0.25 g/l, more preferably no more than about 0.1 g/l, and even more preferably no more than about 0.01 g/l multivalent metal-cyanide complexes.

The permeate preferentially contains at least about 75% and more preferentially about 90% of the precious metal while the concentrate preferentially contains at least about 75% and more preferentially about 98% of the base metal. Preferably, the permeate is substantially free of the multivalent metal cyanide complex or a multivalent metal cyanide complex concentration of at most about 250 ppm and most preferably about 20 ppm.

Filtration is conducted such that most of the pregnant leach solution is contained in the permeate 132. The retentate 130 preferably comprises no more than about 50% of the pregnant leach solution 42, more preferably no more than about 25% and even more preferably no more than about 10% of the pregnant leach solution 42. In contrast, the permeate 132 preferably comprises at least about 50% of the pregnant leach solution 42, more preferably at least about 75%, and even more preferably at least about 90% of the pregnant leach solution 42.

Preferably, the permeate represents as much of the volume of the pregnant leach solution as possible to maximize precious metals recovery. The monovalent precious metal cyanide complexes will not only pass through the filter but also be removed in the retentate, generally based upon the volumetric ratios of the permeate and retentate. Accordingly, if the permeate constitutes 70% of the pregnant leach solution volume, approximately 70% of the monovalent precious metal cyanide complexes in the pregnant leach solution will be removed in the permeate while approximately 30% will be removed in the retentate. For this reason, it is important to perform the separation such that as much volume as possible is removed in the permeate with as little volume as possible being removed in the retentate. Preferably, the volumetric ratio of the permeate to the pregnant leach solution is at least about 1:2 and more preferably ranges from about 1:5 to about 1:1, and the volumetric ratio of the retentate to the pregnant leach solution is no more than about 1:2 and more preferably ranges from 1:3 to about 1:10.

The process of membrane separation is osmotic pressure regulated, i.e., the separation process does not initiate until a critical operating pressure is developed across the membrane. Osmotic pressure is dissolved solids concentration regulated which reflects in higher operating pressures for each stage in a separation circuit (e.g., the first stage might remove $\frac{1}{3}$ of the solution as fresh water permeate thereby concentrating the copper-base metals ions into a $\frac{2}{3}$ volume stream which is, by definition, more concentrated, hence the next $\frac{1}{3}$ water removal step will of necessity be done at a higher cross-membrane pressure). The operating pressure used for filtration preferably is at least about 100 psi and more preferably ranges from about 100 to about 800 psi, and more preferably from about 300 to about 700 psi.

It should also be noted that, if desired in accordance with preliminary testing procedures, the permeate 132 can optionally be re-filtered (e.g. passed through another nanofiltration stage) to further improve the purity of the permeate 132. This may be accomplished in the embodiment of FIG. 1 by rerouting the permeate 132 back into the nanofiltration separatory system 56 (e.g., the membrane unit 64) via tubular conduit 136 shown in dashed lines in FIG. 1. Alternatively, in situations involving large volumes of permeate 132 which are being generated in a high-capacity system (e.g. which are characterized by flow rates of about 1000 GPM or more), an auxiliary nanofiltration separatory system [not shown] separate from the main separatory system 56 can be employed for this purpose. In a representative and non-limiting embodiment, an exemplary auxiliary system would involve passing the permeate 132 through two nanofiltration cartridges 100 (e.g. of the type discussed above including "Desal-5" cartridges) in parallel, followed by two nanofiltration cartridges 100 in series. However, it is again important to emphasize that the use of an auxiliary separatory system as outlined above is optional and employed on an as-needed basis as determined by many factors including the chemical content of the permeate 132 and the overall operating capacity of the entire system 10.

At this stage, isolation and collection of the gold-cyanide complex (which resides within the permeate 132) is now completed. The gold-cyanide complex can thereafter be treated in any known manner to collect and refine elemental gold therefrom, with the claimed invention not being restricted to any subsequent gold treatment/isolation methods. However, to provide a complete disclosure of the present invention, a number of representative gold isolation techniques will now be discussed.

A number of different approaches exist which may be used to treat the membrane permeate 132 so that elemental gold can be obtained therefrom. Representative, non-limiting processes suitable for this purpose will now be discussed. One possible approach is the Merrill-Crowe process discussed above. Specifically, the permeate 132 (which primarily comprises water in combination with the gold-cyanide complex) is combined with elemental zinc (Zn) in accordance with the following reaction:

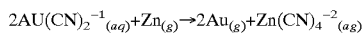

$$2AU(CN)_2^{-1}{}_{(aq)} + Zn_{(g)} \rightarrow 2Au_{(g)} + Zn(CN)_4^{-2}{}_{(aq)}$$

Various lead salts (e.g. lead acetate and/or lead nitrate) may also be added to the reaction process as needed in order to improved the efficiency of the zinc cementation process. In a representative and non-limiting embodiment, approximately 0.003–0.015 g of elemental zinc powder (typically having a particle size of about 40–400 microns) is used per liter of the permeate 132 which contains the gold-cyanide complex therein.

With reference to FIG. 1, the Merrill-Crowe process is schematically illustrated. Specifically, a supply of powdered elemental zinc 138 having the characteristics listed above is combined with permeate 132 via tubular conduits 139, 140. The resulting solid elemental gold resides within the gold-zinc solid sludge reaction product 142. This material is thereafter routed via tubular conduit 146 into a refining system 148 (schematically illustrated in FIG. 1) which is used to obtain purified elemental gold from the reaction product 142. The liquid fraction 150 is separated from the solid portions of the reaction product 142 in the refining system 148 using suitable mechanical filtration devices or decantation/settling processes, and is thereafter routed out of the separation stages of the refining system 148 via tubular conduit 152. The liquid fraction 150 is then transferred via tubular conduit 154 back into the initial stages of the system 10 (e.g. into the vessel 24 containing the leaching solution 22.

The resulting liquid fraction (designated at reference number 150 in FIG. 1) can thereafter be re-used in the system 10 as a source of valuable cyanide ions for the treatment of incoming gold ore 12 which contains both elemental gold and copper. Because the copper-cyanide complex (which now resides in the membrane retentate 130) is not present in the liquid fraction 150, free cyanide ions [(CN)$^-$] in the liquid fraction 150 are not "tied up" and may effectively be reused to treat incoming amounts of gold ore 12. Because the permeate 132 actually includes only about 1–5 ppm of gold therein (which is nonetheless a significant amount in the gold mining industry), a correspondingly small quantity of elemental zinc 138 is employed in this process. As a result, only a minor (e.g. negligible) quantity of the above-listed zinc-cyanide complex is produced. In accordance with this small amount of zinc-cyanide complex (compared with the large quantities of copper-cyanide complex previously in the system 16), as well as chemical differences between the zinc-cyanide complex and the copper-cyanide complex, the liquid fraction 150 containing the zinc-cyanide complex can be re-used without the problems caused by the copper-cyanide complex. In the embodiment of FIG. 1, the valuable cyanide-containing liquid fraction 150 is re-routed back into the initial stages of the system 10 to be combined with fresh quantities of the cyanide-based leaching solution 22, thereby producing considerable cost savings.

The "dewatered" reaction product 142 is thereafter treated in the refining system 148 to isolate and remove elemental gold therefrom. A number of different techniques may again be employed for this purpose within the refining system 148 which shall not be restricted to any single method. For example, after being washed with water to remove residual free cyanide ions and any remaining Zn(CN), complex, the reaction product 142 may be combined with sulfuric acid ($H_2SO_4$) in the presence of air in the refining system 148 to dissolve excess (unreacted) elemental zinc and other metals including copper and cadmium. The remaining solid materials are thereafter washed with water again and dried. If it is determined by preliminary experimental analysis that the resulting solid product contains substantial quantities of mercury (Hg), then the product may be further processed in a conventional mercury retort at about 400° C. to release residual mercury into a condenser assembly which is optimally positioned under water to avoid the release of vaporized mercury into the atmosphere. The sludge-like reaction product 142 may instead be heated in air to form zinc oxide (ZnO) from residual elemental zinc which is thereafter sublimed away.

The elemental gold-containing solid product which results from the procedures listed above may then be smelted within the refining system 148 in combination with a selected flux composition that is designed to oxidize any remaining elemental zinc (as well as other residual non-gold metals) and thereby assist in the removal of metal oxides. Representative flux compounds suitable for this purpose include but are not limited to "borax" (e.g. $Na_4B_4O_7 \cdot 10H_2O$) and silica (e.g. $SiO_2$) in combination.

It should also be noted that while the refining system 148 discussed above basically involves the steps of (1) filtration ["dewatering"]; and (2) smelting, the system 148 may likewise incorporate a number of different steps. The term "refining" as used in connection with system 148 shall therefore encompass a variety of different processes which may be used to yield the final elemental gold product 156.

Another method of interest in treating the membrane permeate 132 having the gold-cyanide complex is the activated carbon process. The activated carbon process is schematically illustrated in FIG. 1 within dashed box 170. The membrane permeate 132 which contains the gold-cyanide complex is placed in direct physical contact with a supply of activated carbon 172 via tubular conduits 174, 176 (FIG. 1). While not shown in the schematic representation of FIG. 1, this step typically occurs in large column-like structures. The term "activated carbon" as used herein involves particulate carbon materials having an amorphous character with a large surface area and a considerable number of pores or "activation sites". Activated carbon may be obtained from the charring of coconut shells or peach pits at approximately 700–800° C., and will typically have the following optimum parameters (1) surface area=1050–1150 m$^2$/gm; (2) apparent density=0.48 g/cc; (3) particle density=0.85 g/cc; (4) voids in densely packed column=40%; and (5) representative particle sizes=minus 6–plus 16 mesh or minus 12–plus 30 mesh. However, the claimed invention (and activated carbon adsorption processes in general) shall not be restricted to these particular parameters which are provided for example purposes only.

Once the membrane permeate 132 containing the gold-cyanide complex comes in contact with the activated carbon 172, an adsorption process occurs which is not yet entirely understood. Specifically, the gold-cyanide complex (which is defined herein to encompass aurocyanide ions, namely, $Au(CN)_2^{-1}$) is adsorbed onto the surface of the activated carbon 172 using a number of theoretical mechanisms including the possible presence of multiple "surface oxide sites" which enable adsorption to occur. Generally, the supply of activated carbon 172 which is used in this method tis operated in a "fluidized bed" mode which may be achieved through the use of a representative flow rate of about 25 gpM/ft$^2$ associated with the carbon-containing column(s) when minus 6–plus 16 mesh carbon 172 is employed. When minus 12–plus 30 mesh carbon 172 is used, a flow rate of about 15 gpM/ft$^2$ is preferred. Both of these parameters will typically result in a bed expansion of about 60%. While this embodiment of the claimed invention shall not be restricted to any particular amount of activated carbon 172 (which will be determined in accordance with routine preliminary testing), a representative and non-limiting example will involve the use of about 2.5–10 g of activated carbon 172 (having the physical characteristics listed above) per liter of the permeate 132.

Regardless of which mechanism ultimately results in adsorption of the gold-cyanide complex on the activated carbon 172, this approach effectively removes the gold-cyanide complex from the permeate 132 and generates a gold-containing carbon product 180 schematically illustrated in FIG. 1. The gold-containing carbon product 180 consists of the carbon 172 having the gold-cyanide complex combined therewith. This process also results in the generation of a "barren" (e.g. stripped) liquid fraction 182 which contains substantial amounts of water and free cyanide ions [$(CN)^-$], but lacks the copper-cyanide complex and gold-cyanide complex therein. This liquid fraction 182 can subsequently be recycled and reused to treat incoming amounts of gold ore 12. In the embodiment of FIG. 1, the valuable cyanide-containing liquid fraction 182 is initially separated from the gold-containing carbon product 180 using conventional mechanical filtration devices or known decantation/settling processes. The liquid fraction 182 is then collected and transferred away from the remaining "dewatered" gold-containing carbon product 180 via tubular conduit 184. The liquid fraction 182 is subsequently re-routed back into the initial stages of the system 10 to be combined with fresh quantities of the cyanide-based leaching solution 22. As shown in FIG. 1, the liquid fraction 182 is routed via tubular conduit 186 back into the initial stages of the system 10 (e.g. into the vessel 24 containing the fresh leaching solution 22).

Next, the "dewatered" gold-containing carbon product 180 is filtered again to remove residual liquid materials therefrom, followed by "desorption" or removal of the gold-cyanide complex from the carbon product 180. This is accomplished by using a selected eluant solution which is placed in direct physical contact with the gold-containing carbon product 180. With reference to FIG. 1, a supply of eluant solution 190 is combined with (e.g. passed through) the gold-containing carbon product 180 via tubular conduit 192. A representative eluant solution suitable for this purpose includes but is not limited to a solution of NaOH-NaCN (e.g. optimally about 0.5–1.0% by weight NaOH and about 0.1–0.3% by weight NaCN containing approximately 20% ethyl alcohol). This solution is likewise heated in a preferred embodiment to a temperature of about 77–120° C. The claimed invention shall not be restricted to any particular amounts of eluant solution 190 which shall be determined in accordance with preliminary tests on the gold-containing carbon product 180 being treated.

However, in a representative and non-limiting embodiment, approximately 2–4 liters of the eluant solution 190 are typically used per kg of the gold-containing carbon product 180 (which this amount being subject to adjustment as needed).

It is theorized that cyanide ions [$(CN)^-$] in the eluant solution 190 described above effectively replace/exchange the adsorbed aurocyanide ions (gold-cyanide complex) which are released into the eluant solution 190. The resulting gold-containing eluant product 196 (which is in the form of a liquid and comprises the "released" gold cyanide-complex therein) is then collected from the "stripped" carbon product 180 via tubular conduit 200 and further processed to recover elemental gold therefrom. The remaining "stripped" carbon product (not shown) can be discarded or regenerated using conventional methods.

At this point, the gold-containing eluant product 196 is transferred via tubular conduit 202 to a refining system 204 which is schematically shown in FIG. 1. The refining system 204 (which may involve a number of different treatment steps of conventional design) enables the recovery of elemental gold from the eluant product 196. Accordingly, this embodiment of the invention shall not be restricted to any particular methods, techniques, or processing equipment in connection with the refining system 204. For example, gold isolation, collection, and recovery within the refining system 204 may be accomplished using zinc precipitation in accordance with the Merrill-Crowe process as outlined above, although conventional electrowinning methods are preferred as part of the refining system 204.

Once the electrowinning process is completed, the elemental gold-containing cathodes are removed from the system and treated to recover elemental gold therefrom, The cathodes at this stage may contain up to about 50% or more gold thereon (e.g. up to about 100 oz. of elemental gold per lb. of cathode if steel wool is involved). To process the cathodes, they may initially be placed in contact with sulfuric acid (H2SO4) in an optional pretreatment step which is designed to dissolve residual non-gold metals including copper, iron, and the like.

The need for a sulfuric acid pretreatment stage is typically determined in accordance with preliminary pilot studies on the electrowinning products (e.g. cathodes) under consideration. If the cathodes contain substantial amounts of mercury (which will not usually be removed by sulfuric acid treatment), they may be subjected to conventional retort processes as discussed above. The cathodes are then smelted in combination with one or more selected flux compositions which are again designed to oxidize residual non-gold metals and thereby assist in the removal of metal oxides. Representative flux materials suitable for this purpose include but are not limited to "borax" (e.g. $Na_4B_4O_7 \cdot 10H_2O$) and silica (e.g. $SiO_2$) in combination.

The refining system 204 may incorporate a number of other steps. The term "refining" as used in connection with system 204 shall therefore encompass a variety of different processes which may be used to yield the final elemental gold product 206. Other representative methods which may be employed to collect and isolate gold-cyanide complexes, following by additional purification to yield elemental gold include (1) solvent extraction procedures which use alkyl phosphorus esters, as well as primary, secondary, tertiary, and/or quaternary amines (alone or combined with phosphine oxides, sulfones, and/or sulfoxides) to extract gold-cyanide complex materials from leaching solutions; and (2)

ion exchange methods and compositions (e.g. resins) in which aurocyanide ions are extracted from leaching solutions, with representative elution materials suitable for use with these compositions including sodium hypochlorite, zinc cyanide, thiocyanate, a mixture of thiocyanate/dimethyl formamide ("DMF"), and the like. Exemplary ion exchange resins which may be employed for this purpose include those sold under the trademark DOWEX and others which are commercially available from the Dow Chemical Company of Midland, Mich. (USA). Both of these gold isolation methods (combined with conventional electrowinning and smelting processes) represent alternative methods which may be used to isolate and collect elemental gold from the membrane permeate 132.

The retentate 130 is specifically routed out of the separatory system 56 via tubular conduit 134, with the permeate 132 being directed out of the system 56 using tubular conduit 135. The retentate 130 may either be discarded, sent to a suitable storage facility, or (more preferably) reprocessed as discussed in substantial detail below to recover elemental copper therefrom. In this regard, the present invention shall not be restricted to any particular method, process, or use in connection with the retentate 130.

As shown in FIG. 1, if subsequent treatment of the membrane retentate 130 is desired, it can be routed via tubular conduit 210 into a refining system 212 so that a final elemental copper product 214 can be generated. The refining system 212 may involve the addition of a selected acid (e.g. sulfuric acid ($H_2SO_4$) to the membrane retentate 130 which causes a precipitation reaction to occur wherein the copper-cyanide complex is precipitated as solid (stable) CuCN, with "free" cyanide ions $[(CN)^-]$ being converted to $HCN_{(aq)}$. The basic reaction associated with this process is as follows:

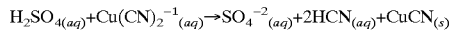

$$H_2SO_{4(aq)} + Cu(CN)_2^{-1}{}_{(aq)} \rightarrow SO_4^{-2}{}_{(aq)} + 2HCN_{(aq)} + CuCN_{(s)}$$

This procedure (which involves one example of a process which may be employed within the refining system 212) is specifically discussed in U.S. Pat. No. 996,170 which is incorporated herein by reference. The solid CuCN may thereafter be treated in accordance with a number of conventional methods to obtain the final elemental copper product 214. For example, representative procedures for achieving this goal include reduction-roasting with $H_2$ gas to yield a "copper sand" that is thereafter smelted.

Alternatively, another procedure which may be employed in connection with the refining system 212 involves combining the membrane retentate 130 with a selected acid (e.g. sulfuric acid [$H_2SO_4$]) and sodium sulfide ($Na_2S$) to yield a Cu2S precipitate in accordance with the following reaction:

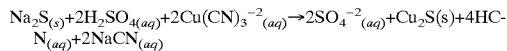

$$Na_2S_{(s)} + 2H_2SO_{4(aq)} + 2Cu(CN)_3^{-2}{}_{(aq)} \rightarrow 2SO_4^{-2}{}_{(aq)} + Cu_2S(s) + 4HCN_{(aq)} + 2NaCN_{(aq)}$$

The $Cu_2S$ precipitate may then be smelted to obtain the final elemental copper product 214 (FIG. 1).

In another embodiment, the metal recovery process generally includes the steps of:

(a) contacting a basic leach solution with a metal-containing material to form a pregnant leach solution containing at least a portion of the metal (e.g., copper, zinc, cobalt, iron, calcium, magnesium, nickel, lead, cadmium, mercury, platinum and palladium and mixtures thereof with copper, Zn, and Ni being more preferred) in the form of a dissolved multivalent complex and suspended solids;

(b) filtering (e.g., using one or more nanofilter membranes) the pregnant leach solution with a filter to form a retentate containing at least most of the multivalent metal complex in the pregnant leach solution and a permeate; and (c) recovering the metal from the retentate by, for example, electrodeposition methods.

The permeate can be further treated to recover monovalent metal complexes, if any, in the permeate or discharged.

The multivalent metal complexes are concentrated in the retentate by approximately ≧2:1, more preferably ≧5:1, and most preferably ≧10:1, to a "metal" stream. The concentrated multivalent metal complex loaded "preg" stream (i.e., retentate) can then be used as feed for the efficient recovery of metals by electrowinning (electrodeposition) processes, by direct electrodeposition of metal from the metal retentate stream, by acidification of the metal retentate (or concentrate) stream precedent to metal recovery to carbon and subsequent electrodeposition of metal from the carbon eluate, by acidification of the metal concentrate stream to form $M(CN)_{solid}$ (where M is metal) and resolutioning of the M(CN) as a high molar concentration feed to the electrodeposition cell, or by treatment of the metal concentrate stream with a chelating agent prior to electrodeposition. Each of these metal electrodeposition circuit options has associated intermediate processing steps to control the quantity of cyanide present in the electrodeposition cell as a means of controlling cyanide electrooxidation losses and improving the Faradic, electric current utilization, efficiency of the metal electrodeposition process. Each of the metal electrodeposition circuit options has electrodeposition circuit internal potentials for additional filter treatments to increase the metal content of the electrowin solution to effect improved cell performance. Coincidental to any of the metal electrorecovery processes is the recovery of a significant, usually greater than 70%, fraction of the cyanide complexed with the metal. The invention can be used for the recovery of metals and cyanide from electroplating rinse waters, primary metals production leach liquors, and primary metals production "eluant" leach solutions (e.g., the cyanide solutions used to strip carbon).

The dissolution of copper from ores containing malachite, chalcocite, covellite, cuprite and bornite by basic (i.e., about pH 10.5 or more) cyanide solutions has long been known. The loaded leach solutions are called "pregnant" liquors (PLS) and are typically dilute, e.g., <2 g Cu/l of leach solution. The direct electrowinning of copper from solutions this dilute is uneconomic due to the large size of the facility required to process the dilute stream (called the space-time factor), and low cell electrical efficiency (low cell efficiency leads to large power consumption). The indirect electrowinning of metals from dilute solutions, i.e., the precipitation of the metals component of the dilute stream prior to the redissolution of the metals for use in high ionic concentration cells requires large volumes of acid for pH adjustment and is generally uneconomic.

The process of this invention uses filter membranes to purge basic water from a pregnant liquor stream or any other metal-loaded cyanide stream to coincidentally effect: (a) a reduction in volume of the stream to be treated (which reduces the size of downstream liquid treatment units); and (b) an increase in the concentration of metal in the resultant metals loaded, basic stream to be treated (i.e., concentrate) by a factor of approximately ≧5:1, more preferably ≧7:1, and most preferably ≧10:1 in the case of copper (the increased Cu concentration improves the Faradic efficiency of direct electrowinning; Faradic efficiency being the electric current utilization measure of an electrorecovery process and largely a function of the frequency of ion-solid interfacial contacts in an impressed electric field, said interfacial contacts being increased in part in proportion to the ionic strength of the solution being treated). Furthermore, the membrane filtration process is shown, for reasons not fully understood but believed to be related to a electrostatic adsorption effects, to greatly reduce the volume of acid required to 4 effect solution pH changes relative to the acid typically consumed in cyanide solution pH adjustment if such pH adjustment is selected as the pretreatment for an indirect electrowin process. Reduced pH is a commonly used method for the selective recovery of copper and base metals as $M(CN)_{solids}$ (as noted, "M" denoting the complexed metal). $M(CN)_{solids}$ alone can be fed to a nearly constant metal concentration electroplating-like electrodeposition process (in electroplating anodes dissolve into the plating bath at the rate of metals electrodeposition to maintain a constant metal ion concentration; in the above-described "electroplating-like" electrodeposition process the source of metal ions for the constant concentration bath is the $M(CN)_{solids}$ salt precipitate). The generation of $M(CN)_{solids}$ from membrane preg solution is therefore economically enabled by reduced acid consumption. The electrorecovery process in electroplating-like electrodeposition is high efficiency because the $M(CN)_{solids}$ can be dissolved in electrorecovery bath solution at high molar concentrations which improves space-time and Faradic efficiencies.

Figure 3:
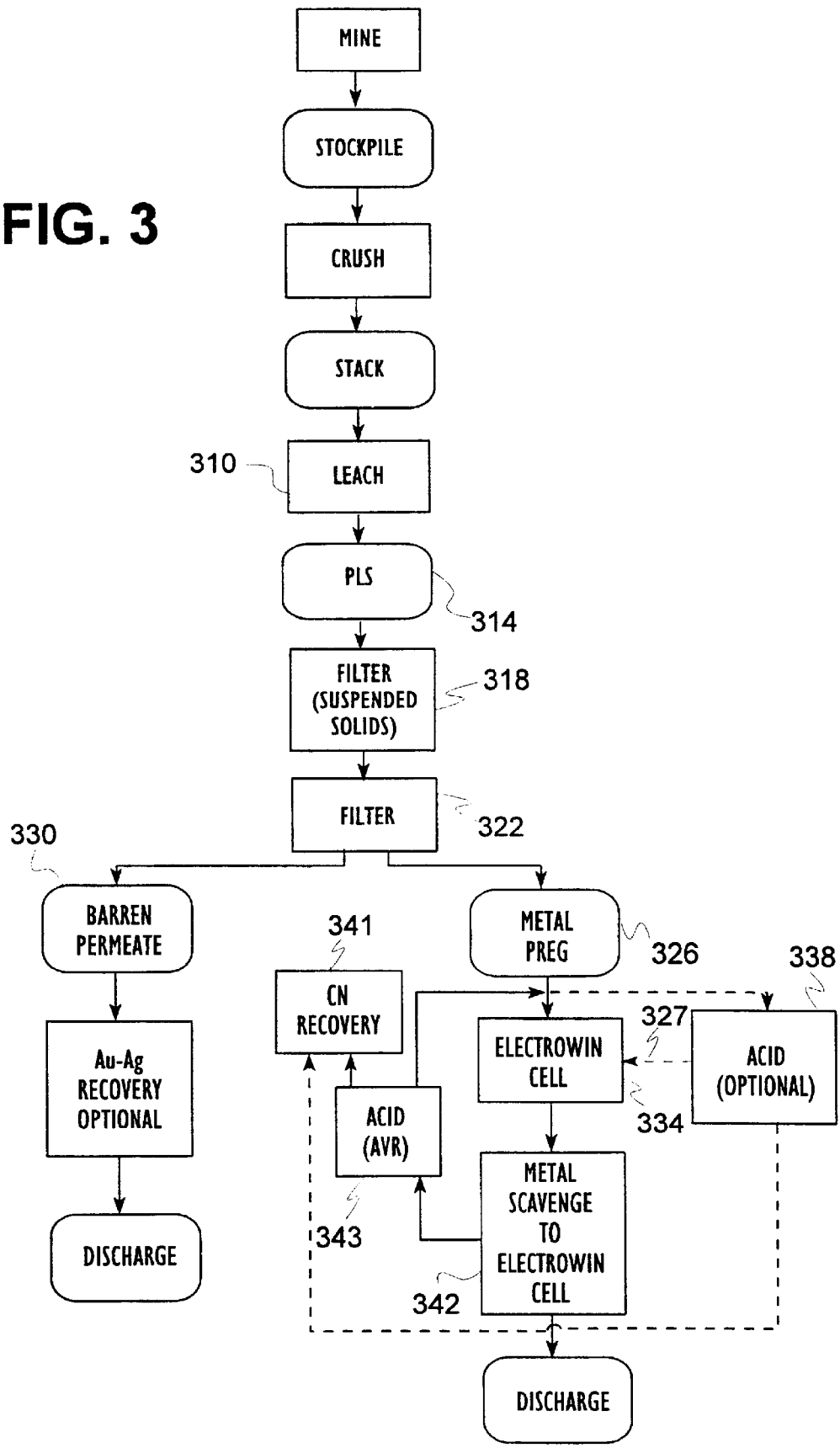
FIG. 3 is a schematic flow diagram illustrating a second embodiment of the present invention.

In one embodiment of the invention shown in FIG. 3, that of primary or secondary (tailing) metal ore treatments, the ore would be heap or vat leached 310 using standard industry practice with cyanide solutions sufficiently strong to dissolve the metal. The result of the leaching is a "pregnant leach solution" (PLS) 314. The PLS 314 would be classified 318, as through an approximately 1–10 micron filter, and passed, at greater than osmotic pressure, through a filter membrane 322 to: (a) effect the rejection of copper or other multivalent metal complexes to the reduced volume membrane "concentrate" 326 and (b) pass the permeate 330 to the permeate processing step or discharge. The membrane processing step decreases the volume of metal-loaded solution (now called the "metal preg") with substantially no loss of metal to the permeate (the metal preg exhibits a 2-times to 10-times, or more, increased metal content, as measured by parts-per-million concentration, relative to the raw PLS). The metal preg can be introduced directly to the circulating catholyte of an electrowinning cell 334 or it can be acid conditioned to recover metals (at a pH preferably ranging from about pH 3 to about pH 6 and most preferably about pH 4) or cyanide, then reconditioned to a pH preferably ranging from about pH 9 to about pH 11.5 and most preferably about pH 10.5, before introduction into the circulating catholyte of the electrowinning cell 334 or, optionally, it can be acid conditioned 338 to a pH preferably ranging from about pH 1 to about pH 3 and most preferably about pH 2 with or without the intermediate recovery of base metal precipitates other than copper, filtered (such as by ultra or microfiltration) for the recovery of the CU(CN) precipitate, and the precipitate introduced to the circulating catholyte of an electroplating-like cell (preferably operated at, or greater than, an 1M metal concentration level). The metal preg 26 is mixed into a circulating catholyte of greater metals concentration than the metal preg itself, or optionally, a metal preg precipitate is mixed into a circulating catholyte and flows through an electrowinning cell to effect metals recovery (the metals electrorecovery cell may be, but is not limited to, an extended area cathode, anolyte-catholyte cation exchange membrane or porous diaphragm separated type, to minimize space-time charges and CN anodic oxidation). Cyanide recovery 341 is effected by the volatilization 343 of the acid treated stream for the removal of dissociated CN.

Upon achieving metals recovery in the electrorecovery cell a volume of catholyte 342 would be expelled from the circuit to purge free cyanide ($CN^-$) and base metals (if the base metals were not purged by selective precipitation earlier in the processing). In the cases of direct metal preg electrowinning (i.e., without the intervening step of pH induced aqueous-to-solid metal change-of-state prior to electrodeposition) the expelled volume is equal to the volume of metal preg initially introduced. The expelled volume is treated to scavenge metal if metal is present in the stream (metal scavenging can be by, but is not limited to, recovery to resin, by acidification and metal cyanide recovery to carbon, recovery by membrane filtration, recovery to a metal chelating agent or other metals recovery processes, e.g., solvent extraction). The metals recovered from the expelling stream would be introduced into the circulating catholyte. In the process of electrodeposition from cell solutions at high metal concentrations based on the constant addition of metal cyanide precipitate, the volume of expelled solution is much smaller than that required to be expelled when electrodepositing from lower metal concentration metal preg feed electrowinning cells. Commonly less than about 5% of the cell solution must be expelled from metal preg precipitate electroplating cells, and the expelled solutions can be redirected to the incoming metal preg for metal recovery and recycling (i.e., the metal preg treatment acidification process serves as both the expelling solution path for cyanide:metal ratio control by volatilization and the recovery of metal).

The metal-preg and metal preg precipitates can be electroprocessed for copper recovery in a small space-time facility relative to a facility designed to electroprocess a raw, membrane unconcentrated, PLS. However the reduced efficiency of electrorecovery processes at elevated CN:metal levels makes impractical more than about a 10%–40% recovery of the metal in a single pass through a cell (at a CN:metal ratio of approximately greater than 4:1 the electrorecovery process ceases altogether; and, since 3 moles of CN are released to the electrorecovery solution for each mole of metal recovered as electroplated metal, the solution CN:metal ratio builds rapidly during the electrorecovery process). It is therefore more economic to introduce the metal preg into a volume of circulating catholyte of higher metal ion concentration. If the, e.g., circulating catholyte is equal in volume to the metal preg and four (4) times greater in metal concentration to the incoming metal preg blend stream, the full metal content of the incoming metal preg stream can be won at a high Faradic efficiency in a single pass through the cell.

Figure 4:
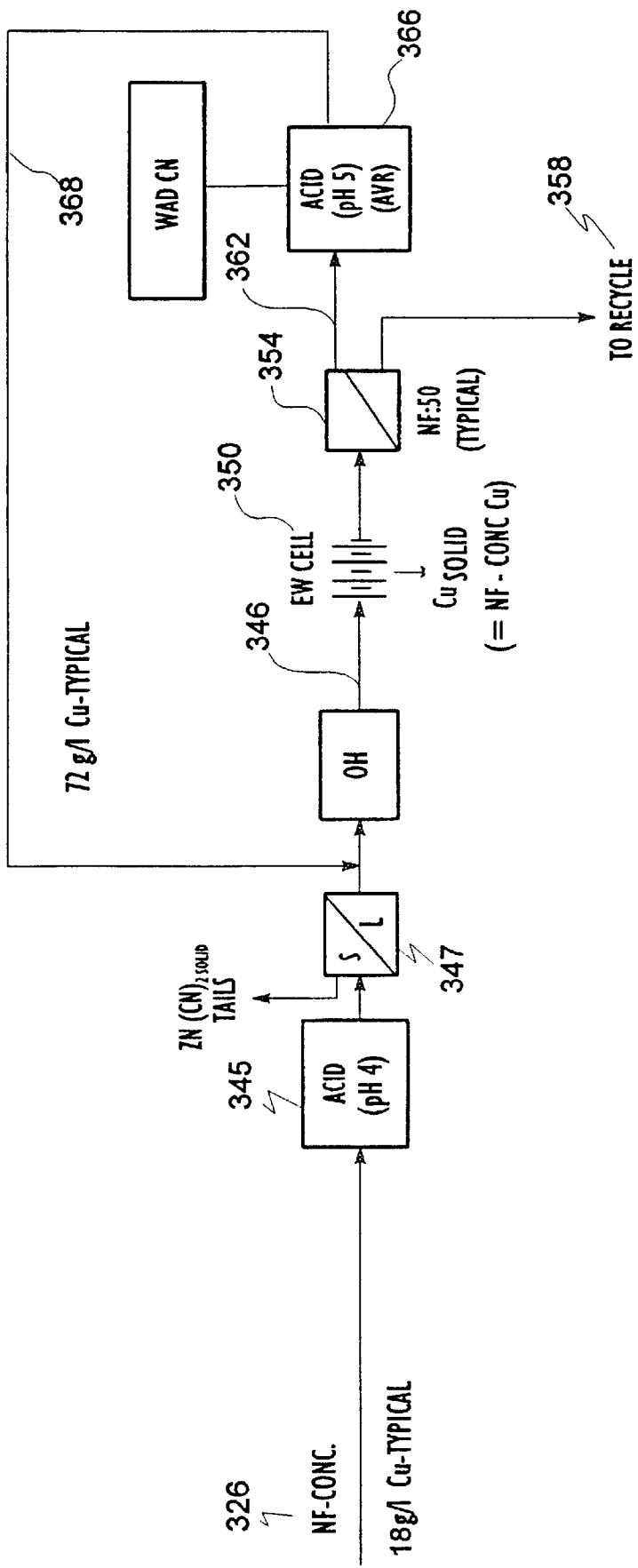
FIG. 4 is a schematic flow diagram illustrating a third embodiment of the present invention.

In another embodiment shown in FIG. 4, the metal preg 326 is acidified 345 to a pH ranging from about pH 4 to about pH 8 to precipitate base metals such as $Zn(CN)_2$, subjected to solid/liquid separation 347 to recover the precipitates, the liquid preg 348 contacted with a base to a pH ranging from about pH 9 to about pH 10.5, and the liquid preg (for metals precipitation and recovery from the stream) 346 introduced into an electrowin cell catholyte 350 which is nanofilter concentrated 354 after passage through the cell (the NF process allows at least most of the metal content of the stream to be recovered to the NF retentate for reuse in the cell while simultaneously expelling the requisite volume 358 of catholyte in the NF permeate to maintain the EW cell water balance. The highest Faradic efficiency and smallest space-time costs for metals recovery by electroprocesses is evidenced by the use of high strength $M(CN)_X$ solutions. These solutions can be artificially constructed by the dissolution of $M(CN)_{solid}$ in appropriately strong $CN^-$ (free cyanide) solutions. By the processes of this invention the recovery of $M(CN)_x$ from the metal preg by acidification is made less acid consumptive by processes unknown but empirically shown to exist, hence this most efficient metals electrorecovery processes $(M(CN))_{solid}$ feed to a cell operated at/or near M(CN)saturation levels) can be used.

The metal preg 326 is acid conditioned 366 to a pH preferably ranging from about pH 4 to about pH 6 and most preferably about pH 5 to (a) facilitate the volatilized recovery of WAD CN 367 and (b) reduce $M(CN)_x$ to a lower state (for example, $Cu(CN)_3$ and $Cu(CN)_4$ complexes to the $Cu(CN)_2$ state). The expelled, $CN^-$ and WAD CN depleted, solution 368 would then be lime conditioned to a pH preferably ranging from about pH 9 to about pH 11.5 and most preferably about pH 10.5 and passed through an activated carbon bed to effect the selective recovery of contained metal $M(CN)_x$ (e.g., for copper as $Cu(CN)_2$) (the other base metal cyanide complexes in the expelled portion of the electrowin solution generally do not recover to the carbon to any appreciable extent). The expelled solution, after exposure to the carbon, can be discarded (or re-used elsewhere, as in primary leaching). The metal (i.e. copper) affixed to the carbon would be eluted at ambient temperature and pressure with fresh cyanide solution. The copper loaded eluate would be reintroduced to the recirculating catholyte, or, optionally, reconcentrated to a high molar level as through a nanofilter treatment step, and the whole process of Cu preg addition, electrowinning, etc., begun again (in industrial practice the process of the invention will be continuous). For Cu preg solutions pre-treated for the removal of base metals (e.g., by acidification 338 and selective precipitation) the expelled volume of catholyte can be the permeate 362 of a nanofilter process 354 (WAD CN would be purged from the system by acidification-volatilization-regeneration (AVR) of the NF concentrate). Similarly, the acidification of the Cu preg stream for the recovery of Cu(CN) precipitate can effect the selective recovery of $M(CN)_x$.

Figure 5:
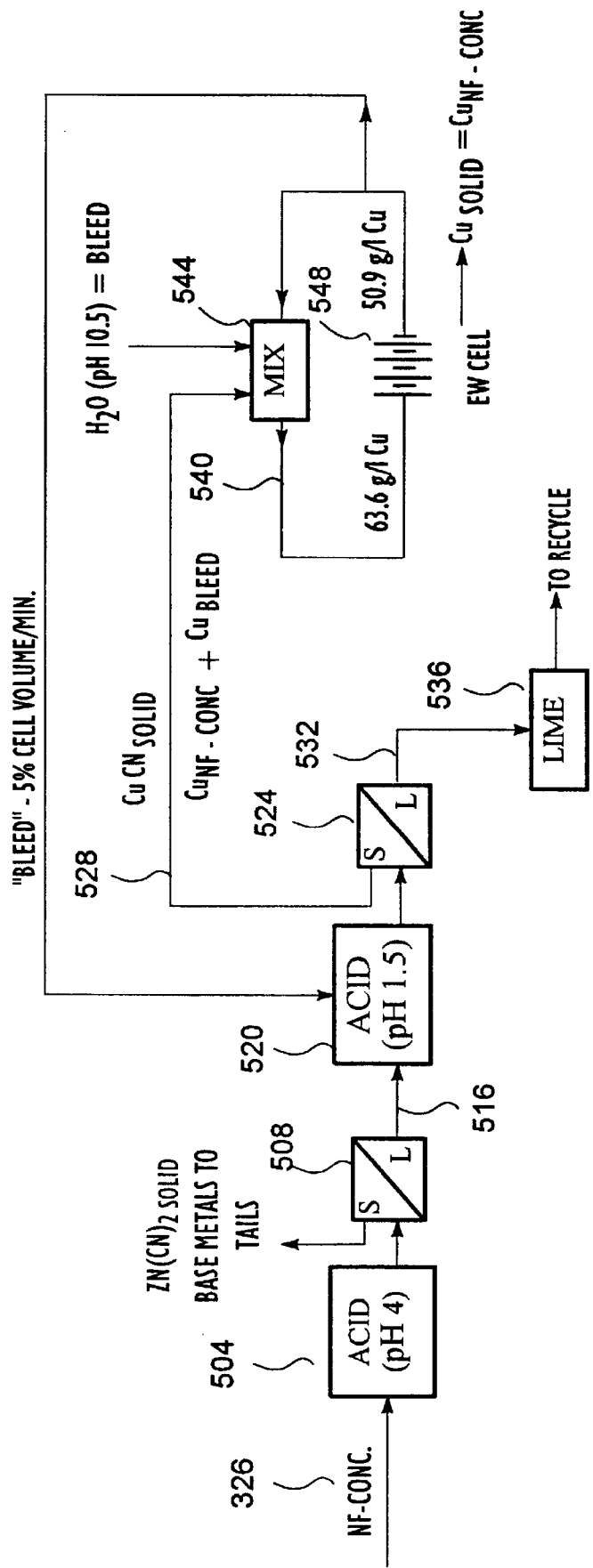
FIG. 5 is a schematic flow diagram illustrating a fourth embodiment of the present invention.

Referring to FIG. 5, yet another embodiment of the invention, the retentate or metal preg 326 is acid conditioned 504 to a pH preferably ranging from about pH 4 to about pH 8 to precipitate base metals such as zinc, subjected to solid/liquid separation 508 to remove the precipitate 512 from the liquid 516, further acid conditioned 520 to a pH preferably ranging from about pH 1 to about pH 3 to precipitate other base metals, such as copper, and subjected to further solid/liquid separation 524 to form a second precipitate 528, which is preferably comprised of copper cyanide, and a second liquid 532. The second liquid 532 can be contacted with a base 536 to raise the pH to about pH 9 to about pH 10.5 and recycled. The first and second precipitates can be subjected to further recovery steps. For copper cyanide as the second precipitate, the second precipitate 528 is contacted with a catholyte 540 in a mixing step 544 and the copper-rich catholyte containing dissolved copper subjected to electrowinning in an electrowinning cell 548.

Figure 6:
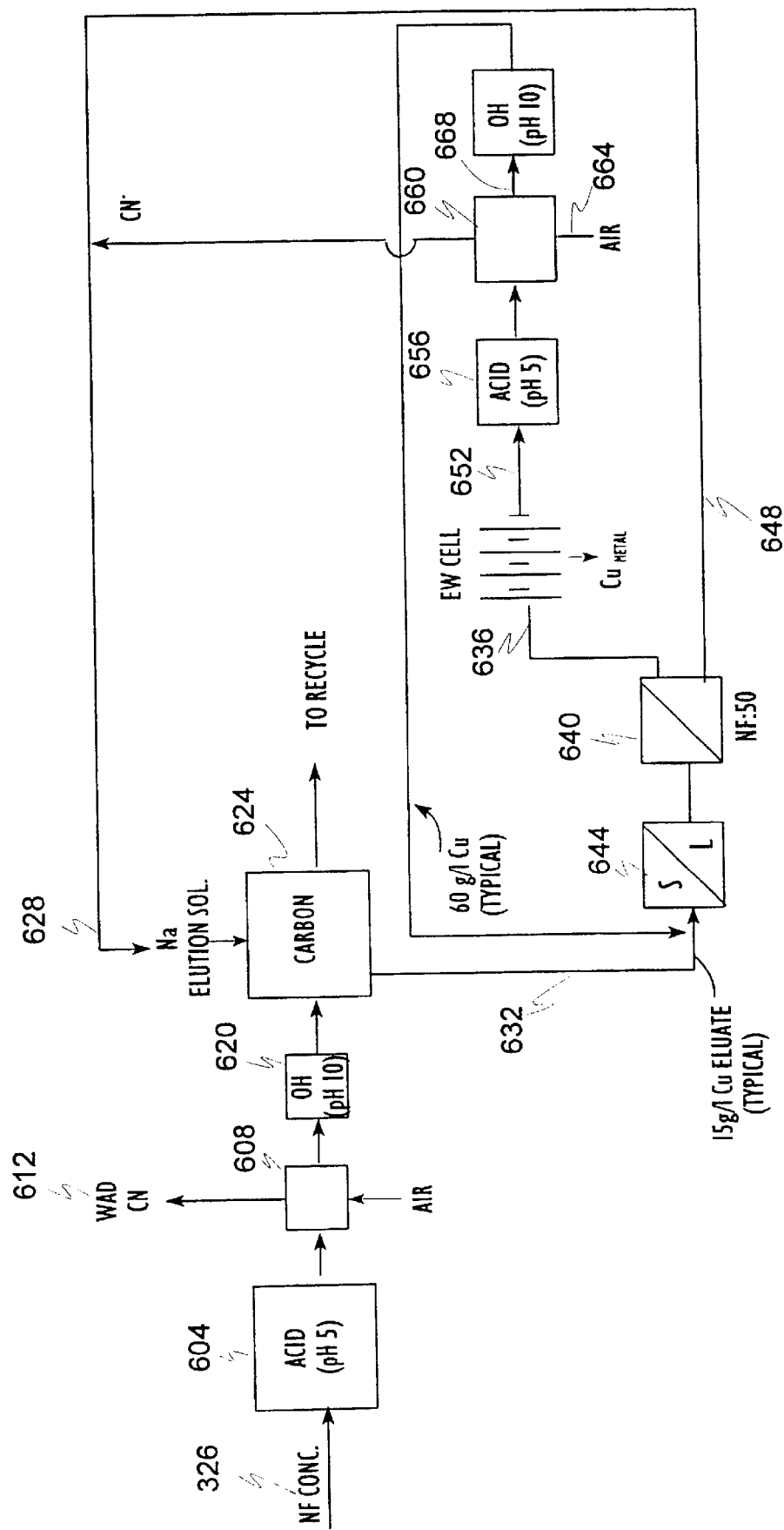
FIG. 6 is a schematic flow diagram illustrating a fifth embodiment of the present invention.

In yet another embodiment shown in FIG. 6, the metal preg 326 is acidified 604 to a pH preferably ranging from about pH 5 to about pH 7, with about pH 6 being more preferred, to effect a metal cyanide speciation change or reduction (e.g., for copper, from $Cu(CN)_3$ and $Cu(CN)_4$ to Cu $(CN)_4$ to Cu $(CN)_2$). The cyanide 612 dissociated from the metal can be recovered 608 from the acidified solution by conventional volatilization-regeneration methods for re-use (the decomplexed cyanide is called WAD cyanide). After WAD cyanide recovery 608, the $M(CN)_x$ rich solution 616 can be reconditioned 620 to a pH preferably ranging from about pH 9 to about pH 10.5, with a pH of about pH 10 being more preferred, and, in the case of copper as the metal, passed through a bed of activated carbon 624 to sequester the copper. The sequestered copper can be eluted from the carbon using an eluate 628 to form a pregnant eluate 632 for use as feed to an electrodeposition cell 636 or, preferably, nanofilter concentrated 640 (after carbon solid/liquid separation 644) prior to introduction to the recirculating catholyte of the electrodeposition cell 636. The retentate 636 which contains at least most of the copper in the pregnant eluate 632 is contacted with the catholyte while the permeate 648 is recycled. The spent catholyte 652 after electrowinning is acidified 656 to a pH preferably ranging from about pH 4 to about pH 7, with pH 5 being more preferred, to form HCN and the HCN recovered 660 by sparging the catholyte with a gas 664 such as air. The cyanide depleted catholyte 668 is contacted with a base to raise the pH to a preferred range of about pH 9 to about pH 10.5, with pH 10 being more preferred.

Figure 7:
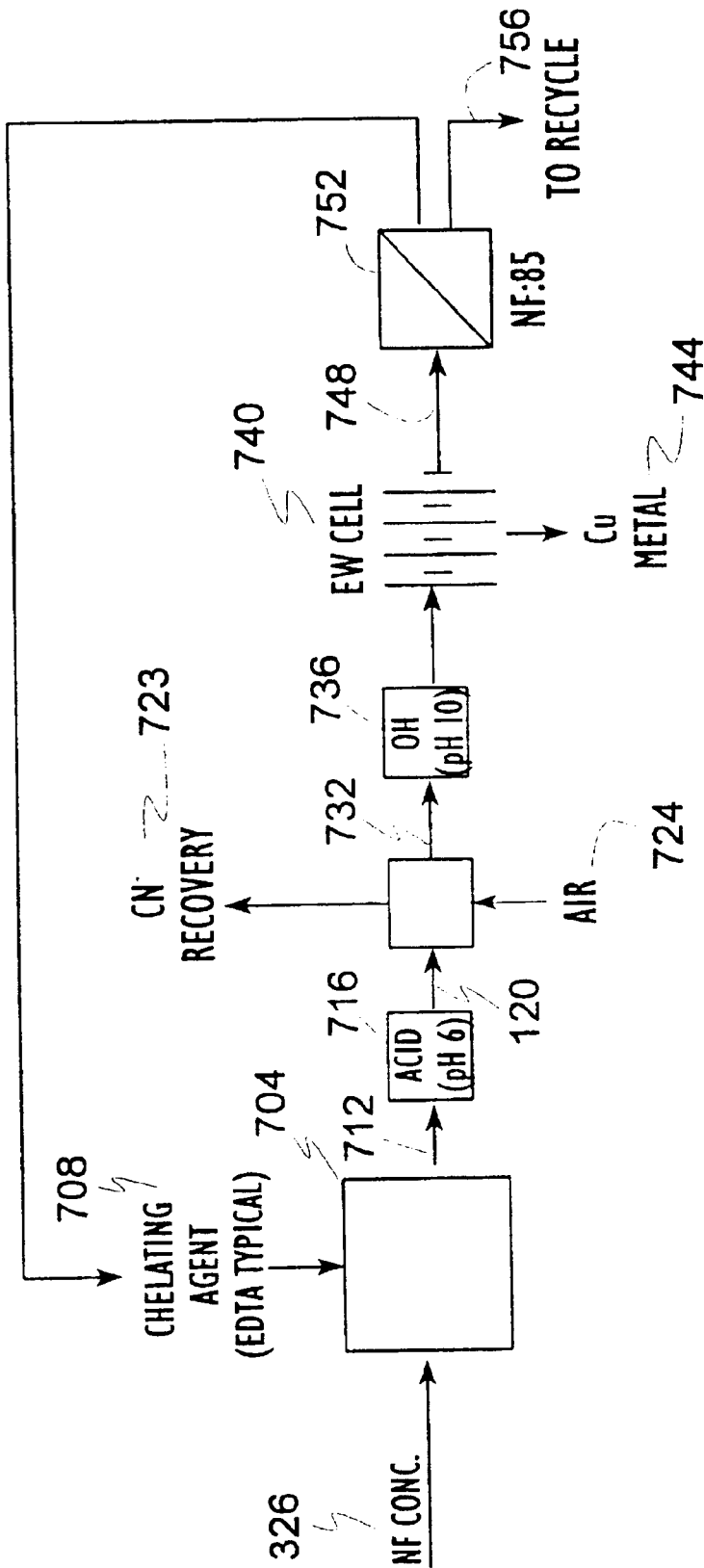
FIG. 7 is a schematic flow diagram illustrating a sixth embodiment of the present invention.

In a further embodiment shown in FIG. 7, the metal preg 326 is treated 704 with a suitable chelating agent 708 (e.g., EDTA (ethylene diamine tetracetic acid)) to form a dissolved chelator-metal complex in a chelated solution 712. The cyanide displaced by the metal chelation can be recovered by acidifying 716 as noted above to form HCN, sparging the acidified solution 720 with a gas 724 to recover HCN 728, contacting the cyanide depleted solution 732 with a base 736 to raise the pH preferably to about pH 9 to about pH 10.5, with about pH10 being more preferred, subjecting the cyanide depleted solution to electrowinning in an electrowinning cell 740 to form a metal product 744 and a spent catholyte 748, and finally subjecting the spent catholyte 748 to nanofiltration 752 to form a retentate 756 containing at least most of the chelator and a permeate containing little, if any, of the chelator. The chelator in the retentate can be reused and the permeate purged for the maintenance of cell water balance.

Figure 8:
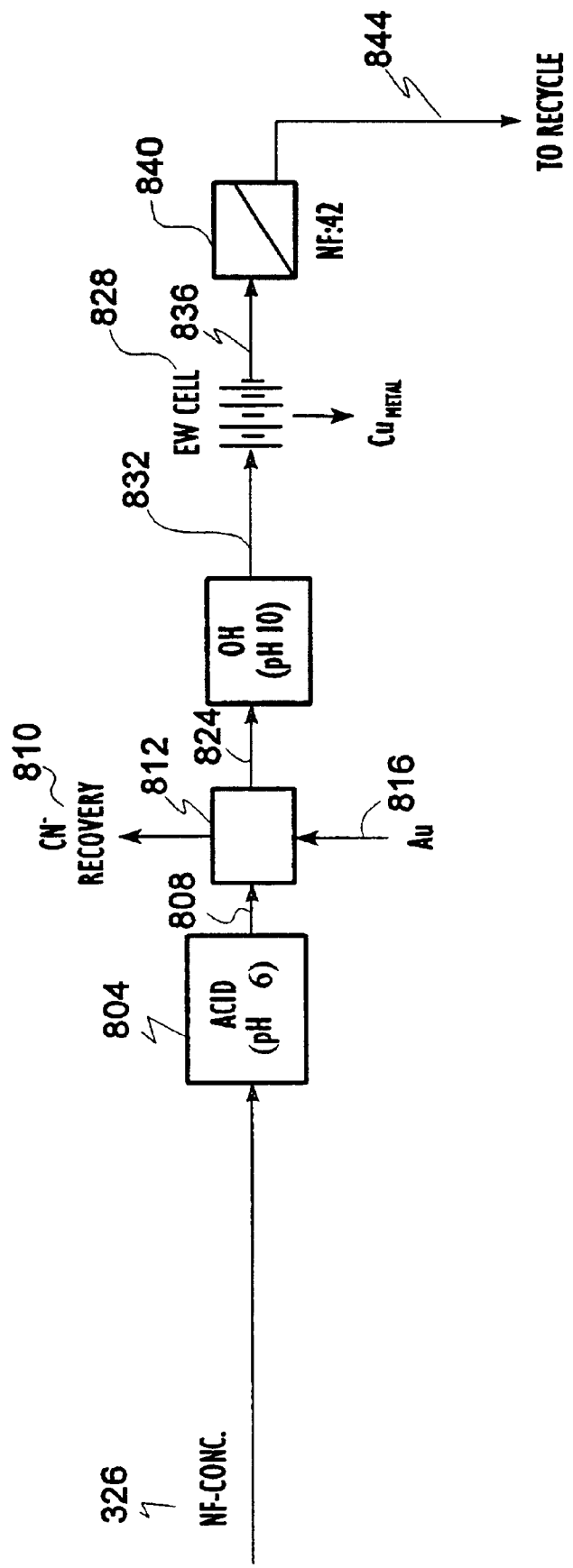
FIG. 8 is a schematic flow diagram illustrating a seventh embodiment of the present invention.

In yet another embodiment shown in FIG. 8, the metal preg 326 is acidified 804 as noted above to form HCN, the acidified solution 808 sparged 812 with a gas 816 to recover cyanide 820, the cyanide depleted solution 824 contacted with a base to raise the pH preferably to about pH 9 to about pH 10.5 with pH 10 being more preferred, subjected to electrowinning 828 (in a diaphragm cell or a cell having the anodic and cathodic compartments separated by an ion exchange membrane). In the case of copper, the metal in the realkalized solution will be predominantly $Cu(CN)_2$. Before electrowinning, the realkalized solution 832 is mixed with a similarly acidified-volatilized-realkalized circulating, metal-rich, catholyte and passed to the electrowinning cell. A portion of the metal in the blended, electrowin cell feed, catholyte is electrodeposited, consistent with the approximately 4:1 CN:metal (i.e., copper) ratio limitation characteristic of electrowinning from cyanide solutions. After electrowinning the appropriate amount of metal from the solution, the spent catholyte 836 is nanofiltered 840 into a metal-rich retentate 844 and a metal lean permeate 848. The metal lean permeate 848 is substantially equal in volume to the metal retentate 844 originally incident upon the process. The metal-rich retentate 844 is recirculated and blended with fresh, incoming, metal-containing solution prior to acidification-volatilization-realkalinization and reintroduction into the electrowinning cell.

This embodiment particularly enables the cost effective leach mining of: (1) metal ores which are basic and acid consumptive (acid leaching being the conventional state-of-the-art for the recovery of metal from ores of these types);

(2) metal ore assemblages which are acid refractory but amenable to cyanide dissolution, especially chalcocitic ores; and (3) metal ores which contain cyanides dissolvable precious metals (including cleaner tails, a "waste" generated by conventional flotation copper recovery processes, which, by the process of this invention, now becomes a "secondary" ore). The enablement is based on the efficient, cost effective, recovery of base metals, especially copper, and base metal and complexed cyanide by direct electrowinning and indirect (acid precipitation-precipitate cell feed), electroplating-like, electrorecovery processes. The enablement, in all embodiments, use this invention of membrane segregation of, and coincidental concentration of, copper and base metal ions to a small volume membrane "concentrate" suitable for cost effective direct electrowinning. Also, in ways not presently understood but assumed related to electrostatic adsorption effects in precipitation processes, the invention reduces acid consumption for the precipitation of metals from membrane concentrate solutions. The precipitates then become the solid M(CN) feed to an electroplating-like metals recovery cell.

In yet another embodiment, the process includes the steps of: (a) filtering (e.g., through one or more nanofilters) the pregnant solution to form (i) a permeate containing most of the precious metal and (ii) a retentate (or concentrate) containing most of the nonprecious metal(s) (or spectator ion interferents); (b) thereafter removing liquid (e.g., water) from the permeate to form (i) a second retentate or "super preg" having a precious metal concentration that is more than the precious metal concentration in the permeate and (ii) a barren solution (or second permeate) including most of the liquid in the permeate; and (c) recovering the precious metal from the concentrated solution. The precious metal can be gold or silver and mixtures thereof. The metal can be any metal that forms a multivalent complex in the pregnant solution, e.g., copper, cobalt, zinc, iron, lead, nickel, calcium, magnesium, cadmium, mercury, platinum, palladium, and mixtures thereof.

Water removal from the permeate can be performed by passing the permeate through a filter, such as a reverse osmosis concentration device that passes water but not the complexed precious metal. Sufficient water is removed such that the volumetric ratio of permeate to the second retentate preferably is at least about 1:1, more preferably at least about 3:1 and most preferably at least about 9:1. The precious metals concentration in the second retentate is at least about 200%, more preferably at least about 900%, and most preferably at least about 1900% of the precious metals concentration in the permeate. Stated another way, at least about 37.5%, more preferably about 50%, and most preferably at least about 90% of the water in the pregnant solution is contained in the barren solution. Commonly, the precious metals concentration in the concentrated solution is at least about 0.002 g/l, more preferably at least about 0.02 g/l, and most preferably at least about 0.1 g/l.

In the precious metal recovery step, the concentrated solution can be treated by a variety of processes, such as electrowinning, acidifidication/electrowinning, recovery to carbon, zinc precipitation, and solvent extraction-electrowinning, with electrowinning, acidification/electrowinning, and solvent extraction-electrowinning being most preferred.

The retentate can be treated to form one or more base metal products by suitable methods, including precipitation techniques, electrowinning, and solvent extraction-electrowinning.

The remaining, precious metals cleansed, reverse osmosis "permeate" is passed back to the forward end of the process train for re-use (e.g., back to leaching), or is discarded.

The process overcomes the spectator ion problem encountered in many precious metal refining techniques, such as zinc or carbon precious metals recovery steps and electrowinning. The process of the present invention provides for the selective recovery of the precious metals and nonprecious metals from nonprecious-precious metals mixed solutions. The resulting precious metal and/or nonprecious metal products can have relatively high rates of purity.

The process is highly efficient and economical. Although the process preferentially uses electrowinning to recover precious metals, the relatively small volume of the concentrated solution provides for a low-space time factor/cost in the electrowinning cell (s) (i.e, a relatively small cell can be used to hold the solution to effect the retention time required for gold ion migration to the cathode). Because of the small volume of the concentrated solution and the high precious metal concentration in the solution, the current efficiency and recovery rates of the electrowinning process are relatively high and relatively small amounts of power are consumed during the electrodeposition cycle. Reagent costs in acidification/electrowinning techniques are relatively low (i.e., the consumptions of acid and lime for pH adjustments are relatively low) because of the relatively small volume of the concentrated solution.

Finally, through the filtration and water removal steps, the process can omit undesirable intermediate carbon concentration steps prior to electrowinning. Accordingly, the process does not suffer from precious metal loss in intermediate carbon concentration steps.

The super-preg is substantially devoid of interferant ions if the nanofilter membrane ionic separation is 100% efficient. However, as is common to industrial processes, the nanofilter segregation of interferant spectator ions will be less than 100% efficient, and some nonprecious metals will contaminate the nanofilter permeate. The precious metals loaded and slightly nonprecious metals contaminated, permeate will, upon reverse osmosis membrane concentration, produce a reverse osmosis concentrate (the super-preg) which contains essentially all (i.e., typically at least about 95% and more typically at least about 98%) of the precious and nonprecious metals present in the reverse osmosis feed nanofilter permeate. The presence of nonprecious metals in the super-preg will interfere with the efficient production of high purity precious metals by the zinc and carbon precious metals recovery processes (the difficulty of pure product production from the super-preg is a function of the degree of its nonprecious metal contamination). Therefore the zinc and carbon recovery of precious metals from the super-preg created by the sequential treatment of pregnant solutions by the first and second filtration steps, though possible, are not the preferred paths to pure product development. Rather, the direct electrowinning, acidification-electrowinning, and solvent extraction-electrowinning which allow for the selective recovery of the precious metals from nonprecious-precious metals mixed solutions, are preferred super-preg treatments.

As noted, the direct electrowinning of precious metals from dilute, unconcentrated, pregnant solutions is seldom done because (a) the space-time factor is excessive ( i.e., the large cell required to hold the solution to effect the retention time required for gold ion migration to the cathode results in uneconomically large equipment capital costs), and (b) the current efficiency of the electrowinning process from dilute solutions is extremely low (e.g., typically 1%–3%) and large amounts of power are consumed during the electrodeposition cycle. Electrowinning from an eluate after precious metals recovery to, e.g., carbon, is common industry practice. Precious metals are lost in this intermediate carbon concentration step, therefore less precious metal is recovered, and the presence of interferant metal ions in the carbon eluate degrade the quality of the electrowon product.

In acidification-electrowinning, base metals are selectively precipitated from a pregnant solution such that precious metals alone are fed to the electrowinning cell. For dilute, unconcentrated pregnant solutions the consumptions of acid and lime (for the pH adjustments down and up, respectively) by this method are uneconomically large. Also, the problem of large, electrowin cell space-time related cost still remains.

By the process of this invention, i. e., that of separation of nonprecious metal ions and later concentration of the permeate to a high precious metals content, small volume, super-preg, the direct electrowinning of precious metals from the super-preg, or the solvent extraction-electrowinning of precious metals from a super preg solution, or the acidification-electrowinning of precious metals from a super-preg with a high nonprecious metals content (e.g., for pregnant liquors which do not nanofilter efficiently), can be employed because (1) the space-time costs for the electrowinning cell are greatly reduced by the higher precious metals concentrations and smaller volumes of solution being treated, or (2), in the case of the acidification-electrowinning method, the aforesaid reduction of space-time cost reduction is combined with small consumptions of acid and lime (for pH adjustment down and up, respectively) because of the small volume of solution being treated. By the preferred processes of this invention, nanofiltration purges at least about 50%, and more preferably about 90% of the raw pregnant solution volume to the permeate, and the reverse osmosis process purges at least about 50% and more preferably at least about 80% of the permeate to the second permeate, to yield a super-preg which is about 10% and more preferably about 4.5% or less of the incoming raw, dilute, pregnant solution volume. The super-preg is also about twenty times higher in precious metals content than the incoming, dilute, pregnant solution. That is, the super-preg typically has a precious metals content of at least about 0.002 g/l, more typically at least about 0.02 g/l, and most typically at least about 0.1 g/l. In combination this volumetric reduction of feed to, and concentration of product precious metals value in, the electrowin cell feed makes direct electrowinning, acidification-electrowinning and solvent extraction-electrowinning economically practical for the recovery of high quality, pure, precious metals.

Figure 9:
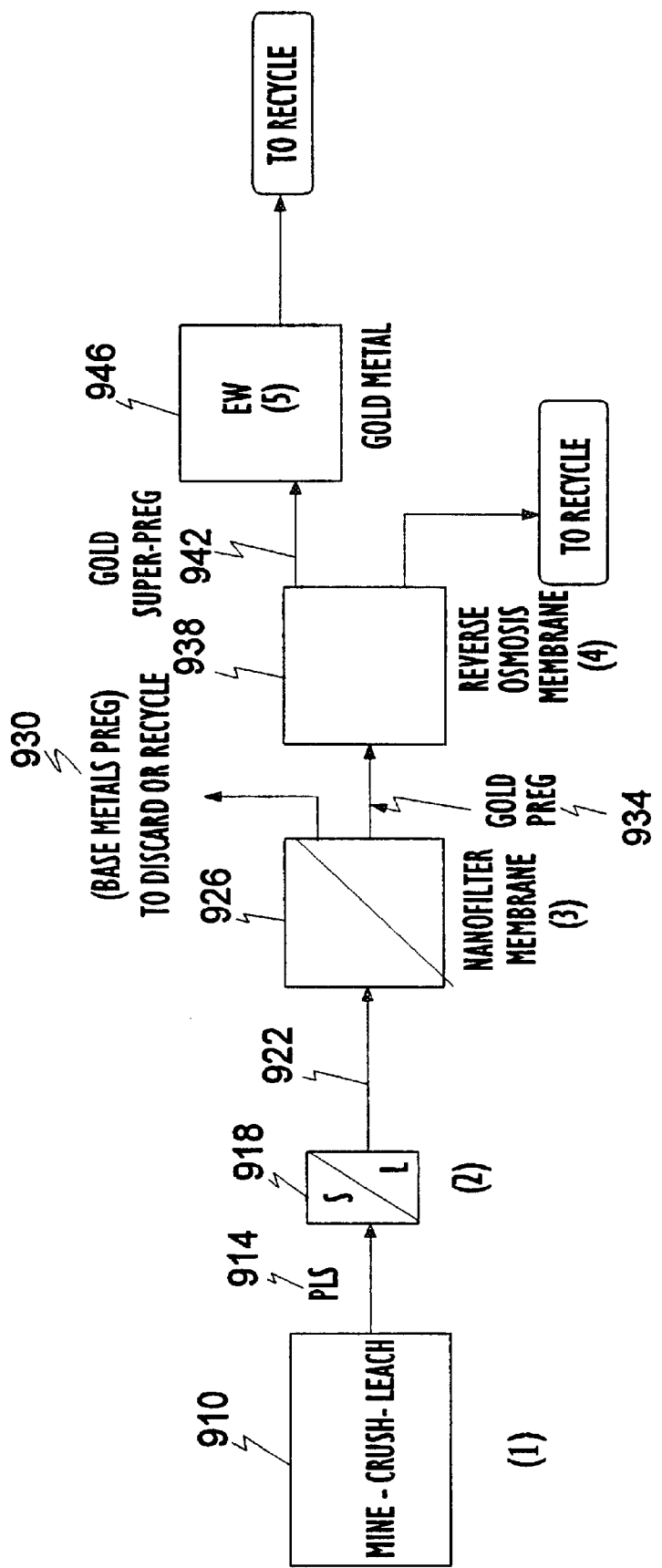
FIG. 9 is a schematic flow diagram illustrating an eighth embodiment of the present invention.

Referring to FIG. 9, gold-bearing ores are mined, crushed and leached 910 using a dilute cyanide solution, thus creating a pregnant-leach-solution (PLS) 914; the PLS 914 is filtered 918 as through a about 1–10 micron filter to effect the removal of dirt and debris; the filtered PLS 922 is preferably passed through a nanofilter membrane separation process 926 to effect the recovery of nonprecious metals to a "nonprecious metals preg" 930 of about ⅓ or less of the original PLS volume, or, most preferably, to about ¹⁄₁₀ the original PLS volume, or less, and the precious metals to a "precious metals preg" 934 approximately equal in volume to the remainder of the filtered PLS 922 (precious metal recovery to the precious metals preg stream is in direct proportion to the ratio of the "permeate" (precious metals preg)/"retentate" (nonprecious metal preg) split made by the membrane. The nonprecious metals preg 930 can be discarded or re-used in the leach operation; if discarded a precious metal "scavenger" assembly (e.g., a carbon or resin column) would optionally be employed to recover the precious metal value in the nonprecious metals preg stream); the precious metals preg 934 would be reverse osmosis (RO) 938 treated to purge at least about 75% of the water, and most preferably, 95% or more of the water, from the precious metals preg stream (the purged water, the RO permeate, is recycled to the operation or discarded); this membrane treatment sequence effectively concentrates about 60% or more, and most preferably about 90% or more, of the original PLS feedstream precious metal to the "super preg" stream 942 about ⅙ or less the size of the filtered PLS 922, or most preferably to a stream about ¹⁄₂₀ or less the size of the filtered PLS 922; and the precious metal would be won as refined metal by, but not limited to, direct electrowinning, acid precipitation-electrowinning or solvent extraction-electrowinning 946.

In yet another embodiment, an effluent containing the cyanide is subjected to the following steps:

(a) filtering the effluent to form a concentrate containing most of the cyanide in the effluent and (b) contacting the concentrate with light and an oxidant to photocatalyze oxidation of the cyanide to a cyanate. By concentrating the cyanide prior to performing photo catalyzed oxidation, the amount of oxidant consumed is significantly less than that required in the photo catalyzed oxidation of more dilute cyanide solutions. The process is not limited to photo catalyzed oxidation of cyanide but is applicable to any process for converting cyanide to cyanate.

In the filtering step, it is preferred that the filtration be performed using a nanofilter.

The filtration is generally highly selective. The concentrate preferably includes at least about 95% and more preferably from about 98 to about 100% of the cyanide (and complexing metal) in the effluent while the permeate preferably includes no more than about 5% and more preferably from about 2% to about 1% of the cyanide (and complexing metal) in the effluent. The concentrate preferably constitutes no more than about 25% by volume and more preferably no more than about 10% by volume of the effluent.

Preferably, the oxidant is hydrogen peroxide. The amount of oxidant contacted with the concentrate preferably is at least about 100% and more preferably ranges from about 100 to about 200% of the stoichiometric amount required to react with the cyanide in the concentrate.

To provide efficient cyanide filtration, the cyanide, especially the free cyanide, in the effluent is preferably contacted with a metal to form a multivalent metal cyanide complex. Preferred metals are selected from the group consisting of copper, zinc, nickel, iron, and mixtures thereof. The amount of metal contacted with the effluent is preferably at least about 100% and more preferably at least about 150% of the free cyanide concentration in the effluent. The concentrate typically includes at least about 98% of the metal in the effluent.

To adjust the calcium concentration, the effluent can be contacted with a calcium precipitant, such as soda ash, or an ion exchange resin. The calcium is removed to prevent calcium sulfate and calcium carbonate from precipitating on and clogging the filter. The preferred maximum calcium concentration in the concentrate is about 300 ppm and in the effluent is about 10 ppm.

To further concentrate the cyanide in solution, the concentrate can be subjected to acidification-volatilization and in some cases neutralization. In this process, sodium sulfide ($Na_2S$) is added to the concentrate and the concentrate is acidified to reduce the pH to no more than about pH 3, which causes the cyanide to become unstable in solution and metal sulfides (e.g., copper sulfide) to precipitate from solution. A gas (e.g., air) is sparged through the concentrate to form cyanide gas which is removed from the concentrate. The cyanide gas in the offgas is solubilized in solution by known techniques, such as by sodium hydroxide or milk-of-lime scrubbing. In this manner, the concentration of the cyanide in the solution exceeds the cyanide concentration in the concentrate, thereby providing further reductions in oxidant consumption.

Figure 10:
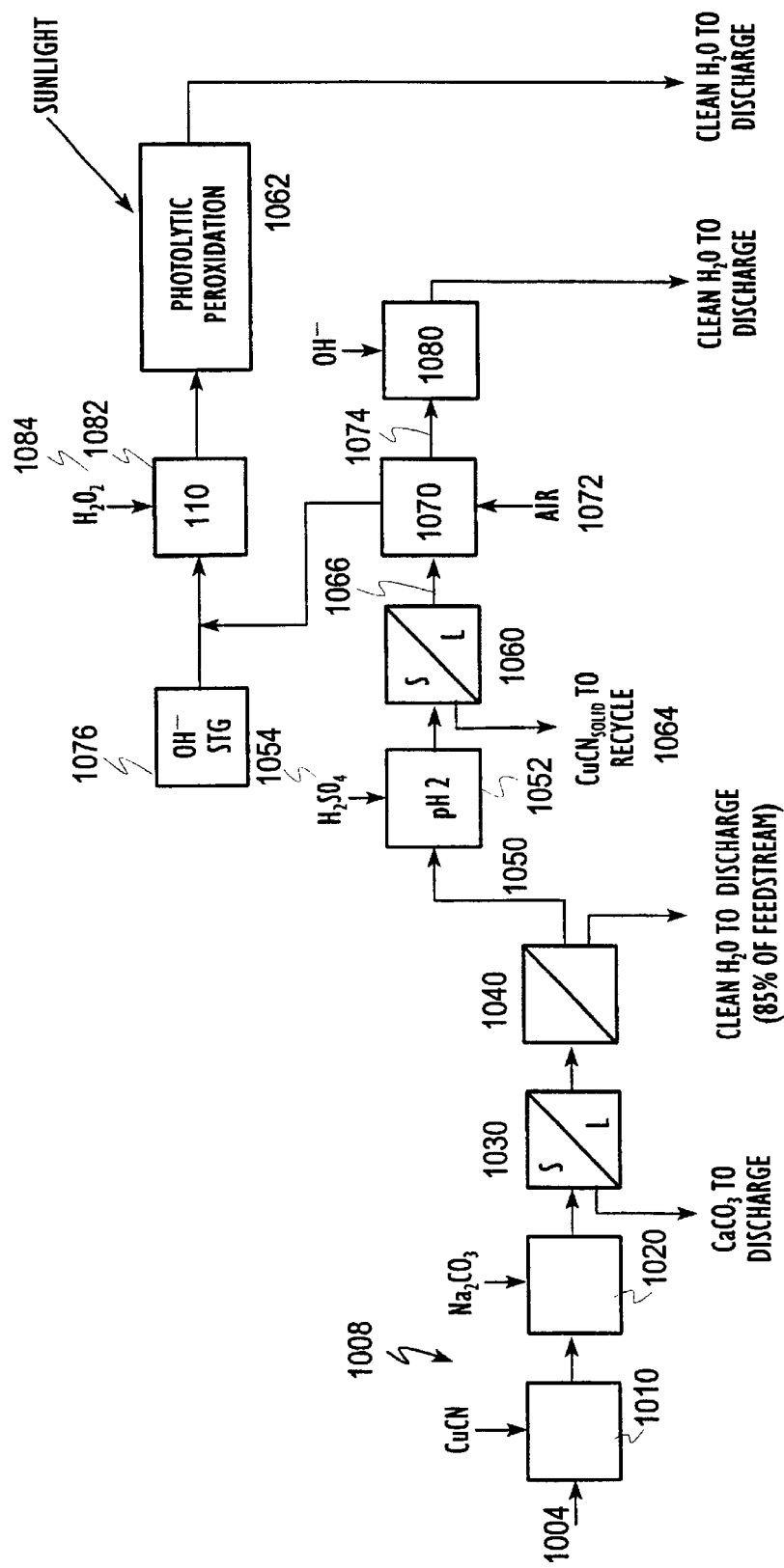
FIG. 10 is a schematic flow diagram illustrating a ninth embodiment of the present invention.

Referring to FIG. 10, a waste stream. 1004 contaminated with free cyanide and/or metals complexed cyanide is conditioned 1008, as required, to: effect recovery of at least most of the $CN^-$ to a metals complexed state by the addition 1010 of $CN^-$ complexing Cu or other cyanide complexing metal, and adjust 1020 the calcium content of the waste stream by conventional $Na_2CO_3$ (soda ash) softening or ion exchange metals precedent to nanofilter concentration 1040 of the metals complexed cyanide component of the waste stream to a 15% or less, by volume, nanofilter process "concentrate," stream 1050. The nanofilter concentrate stream 1050 carries at least most, if not all, of the metals and associated, complexed, cyanide of the waste stream incident upon the membrane circuit. Dependent on the metals content of the nanofilter concentrate stream 1050 and other site specific, operational factors (e.g., the site availability of solar radiation to effect solar photo catalyzed CN oxidation and the availability and cost of land to pond solutions for solar exposure, the cost of $H_2SO_4$ or $H_2O_2$ reagents at the site, etc.), the metals complexed cyanide rich membrane concentrate solution 1050 can be introduced directly to photo catalyzed peroxidation, or further solar pond concentrated prior to photo catalyzed peroxidation. Optionally, the CN content of the solution can be concentrated and the species of CN changed to $CN^-$ by the known process of acidification-volatilization-regeneration, precedent to photo catalyzed $CN^-$ oxidative destruction over a bed of ZnO.

With continuing reference to FIG. 10, the concentrate 1050 is contacted 1052 with an acid 1054 to reduce the pH preferably to about pH 3 or less, with about pH 2 being more preferred, and the CN is removed by acidification-volatilization to form an approximately $\geq 68.9$ g/l CN stream for solar photolytic peroxidation 1062. In response to the reduction in pH, copper cyanide precipitates from solution. The copper cyanide is removed 560 from the acidified concentrate by solid/liquid separation techniques 1060 to produce a copper cyanide solid 1064 for recycle and a copper-depleted concentrate (i.e., the liquid component) 1066. The copper depleted concentrate 1066 is sparged 1070 with a suitable gas 1072, such as air, to volatilize cyanide gas from the concentrate 1066. The sparged concentrate 1074 is contacted 1080 with $OH^-$ or another suitable base to raise the pH preferably to at least about pH 7. The cyanide-containing offgas 1068 is contacted with an alkaline solution 1076, such as by scrubbing, to produce a cyanide-containing solution 1082. The liquid contacted with the cyanide-containing offgas 1068 is basic (i.e., has a pH greater than about pH 10) to cause the cyanide gas to enter into the solution. The cyanide-containing solution is contacted 1084 with an oxidant, such as hydrogen peroxide, and thereafter subjected to solar photolytic peroxidation 1062 to produce clean water for discharge.

The discharge of solutions containing more than trace amounts of WAD CN (i.e., CN loosely bonded with, e.g., Cu, Zn and Ni) or free cyanide ($CN^-$) either directly to the environment or to municipal water treatment systems (e.g., the sewer) is illegal. The WAD and free cyanide components of the solutions must be treated to "kill" the cyanide (i.e., to oxidize the cyanide to cyanate) before such discharges are allowed. There is a class of strongly bonded metals complexed cyanide called "strong-acid-dissociable," or SAD CN, which is allowably discharged.

Where the CN content of a waste stream incident upon the membrane concentrator is $\geq 5$ g/l (i.e., 5000 ppm CN) A the membrane concentrate will issue as approximately 30 g/l $CN_{total}$. Cyanide concentrations of 30 g/l make better use of a peroxide, $H_2O_2$, reactant when peroxide is added to the CN waste stream to adjust the waste stream H2O2 content to 0.88 M (30 g/l) $H_2O_2$ and the solution is solar or otherwise exposed to wavelength appropriate ultraviolet light than lesser cyanide content solutions. Lesser cyanide concentrations can be photocatalytically treated, but with reduced economic benefit, because the $H_2O_2$ reagent is in excess and can not be diluted (i.e., photo catalyzed peroxidative CN destruction is a solution $H_2O_2$ concentration related phenomena). It is uncommon to find industrial wastes as strong as 5 g/l CN and the photo catalyzed peroxidative destruction of CN would be commonly employed on lesser strength solutions (with the previously noted reduced $H_2O_2$ reagent savings benefit) except that lesser CN strength solutions can be strengthened further by low cost solar evaporation precedent to photo catalyzed peroxidation.

Another option for the treatment of lower CN concentration solutions is the sulfidization-acidification-volatilization-regeneration (AVR) of CN from the waste stream to a concentrated (70 g/l $CN^-$ content) hydroxide stream. The Sulfidization-AVR process volatilizes the free and complexed cyanide content of a waste stream for recovery as $CN^-$ to a hydroxide scrubbing tower solution. If the $CN^-$ component of the recovered hydroxide solution is high (e.g., 68 g/l or more $CN^-$) the solution can be fully beneficially photocatalytically peroxidized. Strong and weak $CN^-$ hydroxide solutions can also be photocatalytically $CN^-$ oxidized by exposure to sunlight or other wavelength appropriate ultraviolet light over a bed of semiconductor particles, like ZnO.

The reagent usages required for the photo catalyzed destruction of CN by chemical means are reduced by an order of magnitude over the reagent usages required for the destruction of unconcentrated, raw, waste cyanide streams. While waste stream concentration can be by means other than the nanofilter membrane method, most notably by ponding and solar evaporative concentration, the creation of large bodies of CN laden wastewater in the open represents a risk to local and migrating wildlife and, potentially, human trespassers. By nanofilter concentration of the waste stream such that 85% of the effluent is CN purged and suited for immediate disposal, the size, cost and associated liability of additional solar evaporative pond concentration is substantially reduced.

If the Sulfidization-AVR process is employed, small volumes of concentrated $CN^-$ solution can be daily exposed to sunlight in reaction trays and the pond evaporative concentration liability and cost eliminated entirely.

In yet another embodiment, a nonprecious metal recovery process includes the step of filtering a pregnant cyanide leach solution containing the nonprecious metal to form a concentrate containing most of the nonprecious metal and a permeate. Typically, the cyanide leach solution is generated during a precious metals recovery process. When the concentrate includes a first nonprecious metal such as copper and a second base metal such as zinc, iron and nickel, the process can include the further steps of first removing the second nonprecious metal from the concentrate and second recovering the first nonprecious metal from the concentrate.

Figure 11:
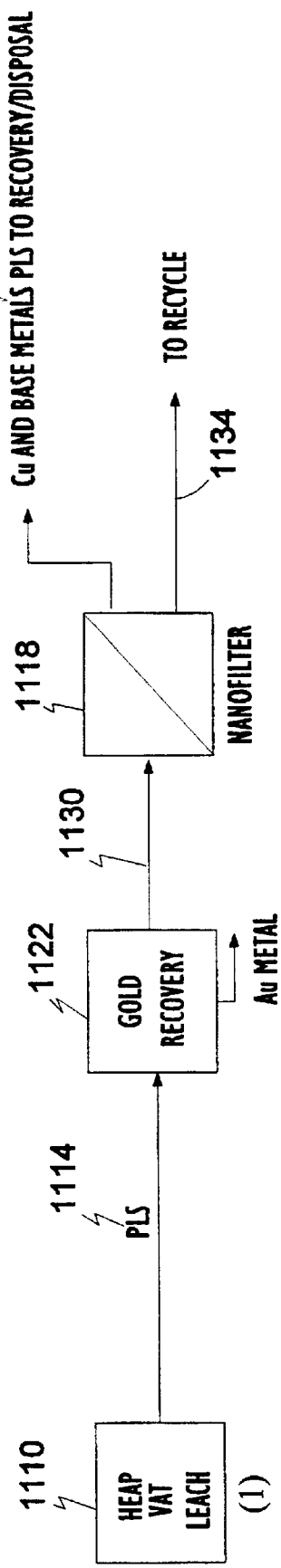
FIG. 11 is a schematic flow diagram illustrating a tenth embodiment of the present invention.

Referring to FIG. 11 in heap or vat leaching 1110 of precious and nonprecious metal-precious metal ores, the pregnant leach solution 1114 is subjected to precious metals recovery 1122 to form a precious metal product and a barren solution 1130. The barren solution 1130 is passed through a nanofilter membrane or other suitable filtration device 1118 to form a retentate 1138 containing at least most of the nonprecious metals. The retentate 1138 preferably represents a $\frac{1}{4}^{th}$ or less, most preferably a $\frac{1}{10}^{th}$, fraction of the barren liquor stream. The $\frac{3}{4}$ of the leach solution 1134 (most preferably $\frac{9}{10}^{th}$ of the original barren volume), uncontaminated by nonprecious metals, can be re-used without deleterious precious metals leach rate and recovery effects. The sequestered volume of nonprecious metal-rich barren 1138 can be processed for the recovery of its cyanide and nonprecious metals and precious metals contents, or discarded.

In yet another embodiment, a base metal and precious metals recovery process includes the steps of (a) solubilizing at least a portion of the nonprecious metal and precious metal, if present, in the feed material to form the pregnant leach solution; (b) adsorbing the precious metal and nonprecious metal in the pregnant leach solution onto carbon or resin; (c) converting the adsorbed precious metal and nonprecious metal into a carbon or resin eluant stream; (d) filtering the carbon or resin eluant stream to form a permeate that contains most of the precious metal and a concentrate that contains most of the nonprecious metal; and (e) recovering by electrowinning, acid precipitation, or other means, the precious metal from the permeate and the base metals from the concentrate.

Figure 12:
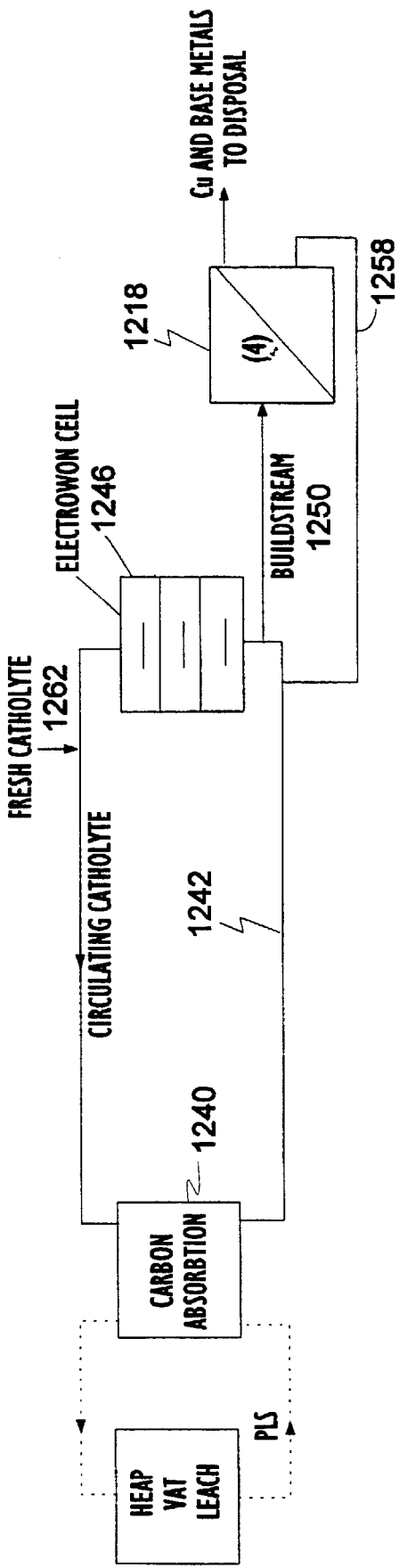
FIG. 12 is a schematic flow diagram illustrating an eleventh embodiment of the present invention.

Referring to FIG. 12, in carbon adsorption 1240 and electrowinning 1246, nonprecious metals and especially copper carry over into the carbon elution solution 1242. This solution 1242 is fed to an electrowinning cell 1246 for the plating of precious metals. Copper and other nonprecious metals contaminate the cathode product of the process unless extraordinary electrowinning techniques like pulsed power are used. The higher the nonprecious metal component of the elution solution, the greater the degree of cathode contamination. The contaminated cathodes require larger dore furnaces and more energy to produce a high quality precious metals product. The nanofiltration 1218 of either the eluate or a bleedstream 1250 of the circulating elution-catholyte solution 1242 can keep the nonprecious metals-copper content of the solution low enough that the nonprecious metal fouling of the precious metal product is minimal. Nanofiltration nonprecious metal concentrate or retentate 1254 would be scavenged for precious metal then wasted. Nonprecious metal purged nanofilter permeate 1258 would be reintroduced into the circulating catholyte stream. Fresh catholyte 1262 equal in volume to that purged from the circuit as nanofilter concentrate 1254 would be bled into the system to maintain solution balance.

While various embodiments of the present invention have been described in detail, it is apparent that modifications and adaptations of those embodiments will occur to those skilled in the art. However, it is to be expressly understood that such modifications and adaptations are within the scope of the present invention, as set forth in the following claims.

What is claimed is:

1. A process for recovering a precious metal from an ore containing the precious metal and a metal other than the precious metal, comprising:

contacting the ore with a cyanide-containing leach solution to form a liquid product containing a dissolved monovalent precious metal-cyanide complex and one or more dissolved multivalent metal-cyanide complexes and having a pH ranging from about pH 9 to about pH 11;

passing at least a portion of the liquid product through a nanofiltration membrane to form a retentate containing a portion of the dissolved monovalent precious metal-cyanide complex and at least most of the one or more dissolved multivalent metal-cyanide complexes and a permeate containing at least most of the dissolved monovalent precious metal-cyanide complex; and thereafter recovering the precious metal in the dissolved monovalent precious metal-cyanide complex from the permeate to form a precious metal product.

2. The process of claim 1, wherein the nanofiltration membrane has an electrical charge to repel the one or more dissolved multivalent metal-cyanide complexes and pass the dissolved monovalent precious metal-cyanide complex.

3. The process of claim 1, wherein the one or more dissolved multivalent metal cyanide complexes include a multivalent copper-cyanide complex and at least most of the copper in the liquid product is in the form of the multivalent copper-cyanide complex.

4. The process of claim 1, wherein the precious metal in the dissolved monovalent precious metal-cyanide complex is selected from the group consisting of gold, silver, and mixtures thereof.

5. The process of claim 1, wherein the metal in the one or more dissolved multivalent metal-cyanide complexes is selected from the group consisting of copper, zinc, cobalt, iron, calcium, magnesium, nickel, lead, cadmium, mercury, platinum, palladium, and mixtures thereof.

6. The process of claim 1, wherein the retentate contains more than about 50% of the one or more dissolved multivalent metal-cyanide complexes.

7. The process of claim 1, wherein the retentate contains less than about 50% of the dissolved monovalent precious metal-cyanide complex.

8. The process of claim 1, wherein the permeate contains at least about 50% of the dissolved monovalent precious metal-cyanide complex.

9. The process of claim 1, wherein in the thereafter recovering step, at least a portion of the precious metal in the monovalent precious metal-cyanide complex is recovered by at least one of the following techniques: cementation, amalgamation, precipitation, ion exchange, electrolysis, absorption, and adsorption.

10. The process of claim 1, further comprising recovering at least a portion of the metal in the one or more dissolved multivalent metal-cyanide complexes from the retentale.

11. The process of claim 10, further comprising recycling at least a portion of the cyanide it the retentate after the thereafter recovering step.

12. The process of claim 1, wherein the permeate includes water and wherein the thereafter recovering step comprises passing at least a portion of the permeate through a second filter having a smaller pore size than the nanofiltration membrane to form a second retentate including at least most of the dissolved monovalent precious metal-cyanide complex and a second permeate including at least most of the water.

13. The process of claim 1, further comprising:

contacting at least a portion of the retentate with a chelating agent;

removing cyanide from the retentate to form a cyanide depleted retentate;

recovering at least a portion of the metal in the one or more dissolved multivalent metal-cyanide complexes from the cyanide depleted retentate to form a barren retentate; and passing at least a portion of the barren retentate through a filter to form a second retentate including at least most of the chelating agent in the barren retentate and a second permeate.

14. The process of claim 1, further comprising:

pausing at least a portion of the retentate through an electrowinning cell to recover at least a portion of the metal in the one or more dissolved multivalent metal-cyanide complexes and form a depleted retentate and passing at least a portion of the depleted retentate through a second filter to form a second retentate for recycle to the previous passing step and a second permeate.

15. The process of claim 35, further comprising before the passing step:

contacting at least a portion of the retentate with an acid to convert cyanide into HCN;

removing the HCN from the acidified retentate to form a cyanide depleted retentate; and contacting at least a portion of the cyanide depleted retentate with a base to form an electrolytic solution for the electrowinning cell.

16. The process of claim 1, further comprising:

precipitating at least a portion of the metal in the one or more dissolved multivalent metal cyanide complexes from the retentate as a metal cyanide compound;

thereafter dissolving the metal cyanide compound in an aqueous solution to form an electrolyte solution; and electrowinning the metal from the electrolyte solution.

17. The process of claim 22, further comprising:

absorbing at least a portion of the metal from one or more dissolved multivalent metal-cyanide complexes in the retentate onto a substrate;

desorbing the metal in an eluate solution;

passing at least a portion of the eluate solution trough a second filter to form a second retentate including at least most of the copper and a second permeate; and electrowinning the metal from the second retentate.

18. The process of claim 1, further comprising:

contacting a cyanide-containing effluent with light to convert the cyanide therein to a cyanate.

19. The process of claim 18, further comprising:

contacting the effluent with a metal to convert free cyanide in the effluent to a metal complexed state.

* * * * *

UNITED STATES PATENT AND TRADEMARK OFFICE
CERTIFICATE OF CORRECTION

PATENT NO.     : 6,355,175 B1
DATED          : March 12, 2002
INVENTOR(S)    : Green et al.

Page 1 of 1

It is certified that error appears in the above-identified patent and that said Letters Patent is hereby corrected as shown below:

Column 33,
Line 11, please delete "35" and insert -- 1 -- therefor;

Column 34,
Line 4, please delete "22" and insert -- 16 -- therefor.

Signed and Sealed this

Seventeenth Day of June, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,355,175 B1
DATED : March 12, 2002
INVENTOR(S) : Green et al.

It is certified that error appears in the above-identified patent and that said Letters Patent is hereby corrected as shown below:

<u>Title page,</u>
After Item [21], please delete:
"[22] Filed: Mar. 22, 2000" and insert therefor:
-- [22] PCT Filed: June 4, 1998
[86] PCT Filed: PCT/US98/11476
§ 371 (c )(1),
(2), (4) Date: March 22, 2000
[87] PCT Pub. No.: WO 98/56494
PCT Pub. Date: December 17, 1998 --.

Item [63], delete "[63] Continuation-in-part of application No. 08/871,176, filed on Jun. 9, 1997, now Pat. No. 5,961,833."
Item [60], please delete "Provisional application No. 60/064,280, filed on Oct. 30, 1997, and provisional application No. 60/071,370, filed on Jan. 15, 1998" and insert in item [60] therefor:
-- U.S. application No. 08/871,176 filed on Jun. 9, 1997, now Pat. No. 5,961,833, U.S. Provisional Applications, Serial Nos. 60/064,280 filed Oct. 30, 1997, 60/071,370 filed Jan. 15, 1998, 60/071,367 filed Jan. 15, 1998, and 60/083,282 filed April 28, 1998 --.

UNITED STATES PATENT AND TRADEMARK OFFICE
CERTIFICATE OF CORRECTION

PATENT NO. : 6,355,175 B1
DATED : March 12, 2002
INVENTOR(S) : Green et al.

It is certified that error appears in the above-identified patent and that said Letters Patent is hereby corrected as shown below:

Column 1,
Line 8, please delete:
"This is a continuation-in-part of U.S. patent application, Ser. No. 08/871,176 filed Jun. 9, 1997 now U.S. Pat. No. 5,961,833 issued Oct. 5, 1999; and claims the benefit of U.S. Provisional Applications, Ser. Nos. 60/064,280 filed Oct. 30, 1997, and 60/071,370 filed Jan. 15, 1998."
and insert:
-- This application claims priority under 35 U.S.C. § 371 to International Application No. PCT/US98/11476 (Pub. No. WO 98/56494) filed 4 June 1998 and published in English 17 December 1998, which claims priority to U.S. Patent Application, Serial No. 08/871,176 filed 9 June 1997 now U.S. Patent Number 5,961,883 issued 5 October 1999; and U.S. Provisional Applications, Serial Nos. 60/064,280 filed 30 October 1997, 60/071,370 filed 15 January 1998, 60/071,367 filed 15 January 1998, and 60/083,282 filed 28 April 1998. -- therefor.

Signed and Sealed this

Twenty-fifth Day of November, 2003

JAMES E. ROGAN
*Director of the United States Patent and Trademark Office*